United States Patent Office 2,970,150
Patented Jan. 31, 1961

2,970,150

PROCESSES FOR THE REACTION OF SILANIC HYDROGEN-BONDED SILOXANES WITH UNSATURATED ORGANIC COMPOUNDS WITH A PLATINUM CATALYST

Donald L. Bailey, Snyder, N.Y., assignor to Union Carbide Corporation, a corporation of New York No Drawing. Filed Dec. 17, 1957, Ser. No. 703,246

22 Claims. (Cl. 260—348)

This invention relates, in general, to improved methods or processes for the production of new organosilicon compounds. More particularly, the invention contemplates the provision of unique syntheses for promoting reactions between siloxanes of the type containing at least one silanic hydrogen bond (—Si—H), and organic compounds of the types containing ethylenic (C=C) or acetylenic (—C≡C—) unsaturation.

Heretofore, a substantial body of technology has been developed and reported throughout the patent and general technical literature in connection with the addition reactions of silanes containing silicon-bonded hydrogen, to organic compounds containing unsaturated groupings, or unsaturated groupings in combination with other functional groups. Significantly, to my knowledge, there are no similar reports of research successfully concluded in connection with the seemingly analogous SiH— addition of siloxanes to unsaturated organic compounds. It is believed that this dearth of technological information points to the apparent failure of prior investigators to develop an operative synthesis for effecting reactions of the general class described, rather than to any lack of interest in the matter, in that, the general reaction mechanism offers numerous advantages as compared with the corresponding reaction mechanism between ethylenic or acetylenic hydrocarbons and silanes containing silanic hydrogen.

In general, silanes containing silicon-bonded hydrogen and other reactive groups such as silicon-bonded halogen, cannot successfully be reacted with unsaturated organic compounds containing functional groups due to the fact that the silicon-bonded halogen tends to react with the functional groups to yield undesirable products. For example, compounds such as allyl alcohol and vinyl ethers undergo cleavage, group interchange or other abnormal reactions with chlorosilanes, in addition to the desired reaction with the Si—H bond or bonds. In a similar manner, it is often necessary or desirable to prepare products containing a specific polysiloxane configuration bonded to the organic radical. When silane monomers such as halosilanes or alkoxy silanes are employed for addition to the organic compound, it is necessary to proceed through a hydrolysis and condensation mechanism to form the siloxane, and control of structure is difficult to achieve under these conditions. Furthermore, the hydrolysis conditions are severe enough, in most known instances, to cause undesirable reactions to occur through the functional groups. In accordance with the process of my invention, the foregoing disadvantages, among others, are overcome through the use of siloxanes containing silicon-bonded hydrogen instead of the silanic hydrogen-bearing silane monomers.

The process of the invention is based, in part, on my discovery that siloxanes having one or more silicon to hydrogen bonds can be added to unsaturated organic compounds in the presence of a platinum catalyst to provide good yields of siloxane adducts containing silicon bonded hydrocarbons, or silicon bonded hydrocarbons containing functional substituents such as alcohol, ether, ester, carboxyl, aldehyde, acetal, amine, nitrile, epoxide, etc., groups. The general reacton of the invention may be represented by the following skeletal equation:

(a) 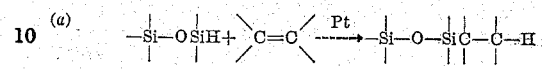

or (b) 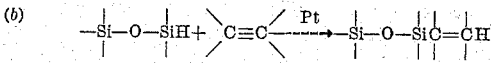

The process of the invention may be practiced with any siloxane, from disiloxanes to high molecular weight polysiloxanes, either linear or branched in structure, and containing from one silicon-bonded hydrogen atom to any greater number of silicon-bonded hydrogens, wherein the other valence bonds of the silicon atoms may be satisfied with any saturated aliphatic or aromatic hydrocarbon radicals. These siloxane reactants may be represented in general by the following unit structural formula:

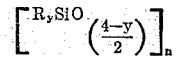

wherein $R_y$ represents a mixture of hydrogen and any saturated, monovalent aliphatic or aromatic hydrocarbon radical, such that—

H/Si ratio=1 or less
R/Si=3/1 to 1/1
$n$=2 or any greater whole number, and
$y$=1 to 3

Typical unsaturated organic compounds that may be employed in the process of the invention include ethylene, acetylene, propylene, butanes, amylenes, octenes, and the like, as well as butadiene, cyclohexene, bicycloheptene, etc., and all similar compounds containing the unsaturated linkages >C=C< or —C≡C—, including olefinic or acetylenic hydrocarbons which also contain functional groups such as hydroxyl, carboxyl, ester, ether, aldehyde, acetal, amine, nitrile, epoxide, etc.

In practicing the process of my invention, I find it to be most convenient to first prepare the desired siloxane structure containing the necessary silicon-bonded hydrogen, and, thereafter, to react this siloxane with the selected unsaturated organic compound to obtain the desired adduct. It is also possible in many cases, however, to subsequently modify or increase the size of the siloxane portion of a siloxane-organic adduct without harming the functional groups introduced during an initial addition reaction, by simply subjecting the resulting siloxane-adduct to conventional acid or alkaline equilibration techniques with other siloxanes.

It is interesting to note that the catalytic activity of platinum in promoting the foregoing addition reactions is apparently unique, in that, other catalytic substances including, for example, copper, Raney nickel, cyclopentadienyl nickel, aluminum chloride, and ditertiary butyl peroxide, are ineffective for the same purpose. On the other hand, the selective utility of platinum as a catalyst within the systems of the general class described was not to be expected in advance of my investigations, since it had been established previously that

for example, produces a pronounced poisoning effect on platinum (see "Poisoning of Platinum Catalyst at High Temperatures," R. H. Savage; J. Chem. Phys., 16, 237–240, 1948).

In actual practice of the process of the invention, I prefer to employ the platinum in the form of a multi-component or heterogeneous catalyst consisting of either platinum supported on finely-divided charcoal (platinized charcoal), or platinum deposited on the gamme allotrope of alumina (platinum-on-gamma-alumina). While the catalyst metal may be employed in any concentration within the range 0.001–5.0 percent by weight (elemental platinum), based on total reactants, I have found that most of the reactions proceed smoothly in the presence of one to two percent by weight of platinum-on-gamma-alumina, containing one to two percent by weight of elemental platinum. Generally, conditions of catalyst concentration, reaction time, and temperature of reaction are not critical, but vary somewhat in accordance with the specific reactants employed. It is essential to effect stirring of the reaction throughout the time of treatment, however, in order to establish and maintain uniform dispersion of the solid catalyst within the liquid reaction phase. In most cases, the reactions can be brought to completion with good yields of the adducts by heating the reactants at temperatures within the range 100–160° C. for periods ranging from two to ten (2–10) hours.

The unique compounds produced by the process of the invention may be employed for a plurality of different uses, including use as intermediates for purposes of introducing a particular organic group into siloxane polymers by conventional equilibration techniques. In addition, they find direct use as low to intermediate viscosity oils for the same general purposes as conventional silicone oils, and for such special applications as their specific functional group might indicate. Thus, such general uses would include application as mold releases, cosmetic ingredients, lubricants, antifoams, hydraulic fluids, etc., whereas the specific uses would depend on utilization of polar groups, for example, for greater lubricity, solvent resistance, and the like.

Many of the compounds obtainable in accordance with my process may be used in the production of silicone elastomers or thermosetting resins. Thus, those adducts containing unsaturation (see Examples 4, 5, 13, 14 and 35, infra) can be combined with other siloxanes to yield rubbers of superior properties, or quicker curing thermosetting resins. Those with polar organic groups (see Examples 7, 9, 10, 11, 12, 15, 17, 18, 19, 24, 25, 31, 32, 34 and 35, infra) may be incorporated within silicone elastomers or thermosetting resins to contribute greater strength, superior cohesive and adhesive forces in bonding to other materials, greater solvent resistance, etc.

These compounds which contain long hydrocarbon chains (see Examples 1, 3, 6, 7, 8 and 16, infra) may be used to give silicone oils or polymers greater compatibility with organic oils or polymers. Compounds containing organic ester groups (see Examples 9, 10 and 11, infra) will react with either organic compounds or polymers and undergo all of the conventional reactions characteristic of organic esters. For example, by ester exchange, these compounds can be incorporated into alkyd type resins or ingredients.

The compounds containing aldehyde or acetal groups (see Examples 11 and 12, infra) will undergo all of the usual organic reactions for such groups, and thereby introduce silicon compounds into new products. They may be employed, for example, as ingredients for copolymers with phenolic, melamine, or urea resins or components. The epoxy-bearing compounds (see Example 15, infra) may be employed in an analogous manner to introduce silicone compounds into organic epoxy resins or other organic systems.

The compounds containing functional hydroxyl groups (see Examples 18, 19, 24, 25 and 35, infra) can be employed for the introduction of silicones into alkyd resins, polyurethanes, and such other organic combinations reactive to the hydroxy group. The cyano functional compounds (see Example 34, infra) may be converted to carboxyl or amino compounds by conventional techniques, and used to introduce these functions into other silicone systems. Lastly, the compounds containing cyclic $Si$-$(CH_2)_a$-$O$ groups (see Examples 31 and 32, infra) may be employed as reactive carriers for introducing silicon compounds into hydroxyl-containing organic systems.

It is believed that the invention may be best understood by reference to the specific examples presented hereinafter as well as the additional descriptive subject matter associated therewith, wherein I have described the preparation of a relatively large variety of typical compounds in accordance with the foregoing principles and procedures. For convenience, the following summary describes the general subject matter covered by the examples:

Examples 1–5 illustrate the addition of simple unsaturated hydrocarbons to siloxanes containing SiH groups;

The siloxanes include:
Disiloxane _____ H/Si=1/2
Trisiloxane _____ H/Si=1/3
Polysiloxane _____ H/Si=1/8

The organic compounds include:
Alkene
Alkyne

Examples 6–14 illustrate the addition of hydrocarbons containing vinyl unsaturation and an additional functional group to siloxanes containing SiH groups;

The siloxanes include:
Trisiloxane _____ H/Si=1/3
Pentasiloxane _____ H/Si=3/5

The organic functional groups include:  Example No.
Ether _____ 6, 7, and 8
Ester _____ 9 and 10
Acetal _____ 11 and 12
Aldehyde _____ 13 and 14

Examples 15–35 illustrate the addition of hydrocarbons containing allyl unsaturation and an additional function group to siloxanes containing SiH groups;

The siloxanes include:
Trisiloxane _____ H/Si=1/3
Disiloxane _____ H/Si=1
Polysiloxane _____ H/Si=1/7
Tetrasiloxane _____ H/Si=1/2

The organic functional groups include:  Example No.
Ether _____ 15 and 16
Epoxy _____ 16
Ester _____ 17
Alcohol _____ 18, 19, 24, 31 and 32
Nitrile _____ 34

Example 25 illustrates a method for increasing the molecular weight of the adduct obtained in Example 19 by equilibration with $(Me_2SiO)_4$;

Example 33 illustrates the reaction of a siloxane containing SiH with an unsaturated silane rather than with unsaturated organic compounds as employed in the preceding examples;

Example 35 illustrates the reaction of an acetylenic compound containing a functional hydroxy group with a trisiloxane;

Example 36 describes the addition to hydrosiloxy groups of hexachlorobicycloheptenyl pentenoate; 1,1-dihydroperfluorobutyl pentenoate; and 1,1,5-trihydroperfluoropentyl pentenoate, for purposes of incorporating the perfluoro moiety and hexachlorobicycloheptenyl end-groups into silicone-organic copolymer hydraulic fluids.

With further reference to the examples which follow, it will be noted that siloxanes containing silanic hydrogens have been reacted with a large variety of unsaturated organic compounds including esters, ethers, alcohols, acetals, aldehydes, and others. It will be further noted that whereas most of the reactions proceeded readily to give pure adducts in high yields, others proceeded equally well but were lowered in yields due to side reactions, and a few systems did not react at all. It is considered that the specific siloxane, heptamethyltrisiloxane, was particularly suited for purposes of establishing the operability of the addition mechanism with various unsaturates, since the adducts formed were usually pure, distillable compounds. The unsaturated compounds which reacted most successfully with either $Me_3SiO(MeSiHO)SiMe_3$ or $Me_3SiO(EtSiHO)SiMe_3$ are listed below in tabulated form together with the yields of adducts obtained. In addition, the unsaturated compounds which were found to react somewhat less readily with siloxanes containing silanic hydrogen are also tabulated for reference purposes. The unsaturates which may be classified as non-reactive were acrylonitrile and allyl amine. Acrylonitrile, for example, could not be added to heptamethyltrisiloxane at temperatures up to 200° C., with or without a platinum catalyst.

TABLE I-A

*Unsaturated compounds which react readily with siloxanes containing silanic hydrogen*

| Unsaturated Compound | Yield (Mole, Percent) |
|---|---|
| $CH_3(CH_2)_5CH=CH_2$ | 80 |
| $CH_2=CHO(CH_2)_2OCH_3$ | 67 |
| $CH_2=CHCH(OEt)_2$ | 70 |
| $(CH_3)_3SiOCH_2CH=CH_2$ | 87 |
| $CH_2=CHCH_2OCH_2CH\underset{O}{\overset{\diagdown\diagup}{-\!-\!-}}CH_2$ | 62 |
| $CH\equiv CH$ | 66 |
| $CH_3CH=CHCHO$* | 75 |
| $CH_2=CHCH_2OH$** | 80 |
| $CH\equiv CCH_2OH$ | 60 |

*The siloxane adds 1,4 through the conjugated system $-C=C-C=O$.
**Some condensation of Si—H with the —OH group occurs.

TABLE I-B

*Unsaturated compounds which react less readily with siloxanes containing silanic hydrogen*

| Unsaturated Compound | Yield (Mole, Percent) |
|---|---|
| $CH_2=CHCOOCH_3$ | 27 |
| $CH_2=CHCH_2OOCCH_3$ | 53 |
| $CH_2=CHCHO$* | 34 |

*The siloxane adds 1,4 to the conjugated system $C=C-C=O$.

(I) SIMPLE UNSATURATED HYDROCARBONS

EXAMPLE 1

*Preparation of bis(trimethylsiloxy)octylmethylsilane [$(Me_3SiO)_2Si(Me)(CH_2)_7CH_3$] by addition of heptamethyltrisiloxane to octene-1*

A 500 cubic centimeter, three-necked flask equipped with stirrer, thermometer and reflux condenser was charged with 44.8 grams (0.4 mole) of octene-1, 111 grams (0.5 mole) of heptamethyltrisiloxane, and 1.5 grams (1.0 wt.-percent) of one percent platinum-on-gamma-alumina catalyst. The reaction mixture was heated with stirring from 125–170° C. for one hour, following which, the flask and its contents were cooled to room temperature and the products centrifuged to remove the catalyst. On rectification of the products, there was obtained 33 grams of low boilers, 2.5 grams of residues, and 113 grams of the desired adduct which yielded the following physical and analytical data:

Boiling point _____ 84–88° C./0.3 mm. Hg.
Refractive index ($n_D^{25}$) ____ 1.4128.

| | Percent C | Percent Si | Percent H |
|---|---|---|---|
| Found | 53.3 | 24.7 | 10.9 |
| Theoretical | 53.8 | 25.1 | 11.3 |

In a similar manner, heptamethyltrisiloxane was added to octene-1 in the presence of platinum-on-charcoal catalyst.

EXAMPLE 2

*Preparation of bis(trimethylsiloxy)octylmethylsilane [$(Me_3SiO)_2Si(Me)(CH_2)_7CH_3$] by non-catalyzed thermal addition of heptamethyltrisiloxane to octene-1*

The thermal (non-catalyzed) addition of heptamethyltrisiloxane to octene-1 was investigated, and in separate experiments performed at 175° C. and 225° C., only 3–4 mole-percent yields of the desired adduct were obtained.

A 300 cubic centimeter stainless steel vessel attached to a rocking autoclave was charged with 45 grams (0.4 mole) of octene-1 and 89 grams (0.4 mole) of heptamethyltrisiloxane. The vessel and its contents were rocked while heating at 175° C. for 7 hours. At the end of this time, the vessel was cooled to room temperature, and 131.5 grams of water-white reaction products were recovered. Upon distillation of the products there were obtained 126 grams of low boilers, 1.5 grams of tarry residues, and 4.0 grams of the desired adduct (B.P. 88–90/0.3 mm. Hg; $n_D^{25}=1.4128$).

EXAMPLE 3

*Preparation of $[(Me_2SiO)_{15}(C_8H_{17})_2SiO]_x$ by addition of octene-1 to polysiloxane $[(Me_2SiO)_{15}(H_2SiO)]_x$*

A siloxane copolymer of composition $$[(Me_2SiO)_{15}(H_2SiO)_x]$$

was reacted with octene-1 by adding a dilute toluene solution of the copolymer dropwise to a refluxing mixture of octene-1 and a platinum catalyst at 120° C. The silanic hydrogen in the copolymer was replaced by octyl groups as proven by analysis and infrared measurements. Analysis of the reaction product yielded the following data:

| | Percent C | Percent Si | Percent H |
|---|---|---|---|
| Found | 43.9 | 30.7 | 10.1 |
| Theoretical | 40.0 | 31.4 | 9.7 |

EXAMPLE 4

*Preparation of bis(trimethylsiloxy)vinylmethylsilane [$(Me_3SiO)_2Si(Me)CH=CH_2$] by addition of heptamethyltrisiloxane to acetylene*

Heptamethyltrisiloxane and acetylene were reacted by injecting the siloxane compound at a constant rate into an atmosphere of acetylene at 130° C. in the presence of a solvent and platinum catalyst to form the adduct indicated. The reaction was carried out in this manner to avoid formation of the bis compound,

$(Me_3SiO)_2$—$Si(Me)CH_2CH_2Si(Me)(OSiMe_3)_2$

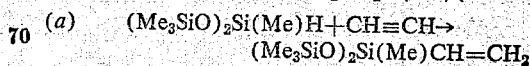
(a)    $(Me_3SiO)_2Si(Me)H + CH\equiv CH \rightarrow$
           $(Me_3SiO)_2Si(Me)CH=CH_2$

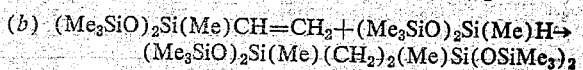
(b)   $(Me_3SiO)_2Si(Me)CH=CH_2 + (Me_3SiO)_2Si(Me)H \rightarrow$
        $(Me_3SiO)_2Si(Me)(CH_2)_2(Me)Si(OSiMe_3)_2$ Thus, into an 800 cubic centimeter steel bomb there were placed 200 cubic centimeters of tetrahydrofuran and 2.0 grams of one percent platinum-on-gamma-alumina. After flushing with nitrogen at 350 pounds per square inch pressure, three times, the bomb was heated to 130° C. and pressured with acetylene to 265 pounds per square inch. Heptamethyltrisiloxane, in total amount of 160 grams (0.72 mole), was injected into the bomb at a rate of 10 milliliters per five minutes. The total uptake of acetylene was 194 pounds per square inch over a period of 2.5 hours. After cooling, the content of the bomb was removed, the bomb being washed with 100 milliliters of acetone, and the tetrahydrofuran-acetone solution was filtered to separate the catalyst. The solvent was removed by distillation and the residue was fractionated through a 45-plate column. Bis(trimethylsiloxy) vinylmethylsilane, in amount 117.5 grams (66%) was obtained. A residue of high boilers amounting to 13.5 grams remained. The desired adduct yielded the following physical and analytical data:

Boiling point _____ 46–48° C. (8.8 mm.).
Refractive index ($n_D^{25}$) _____ 1.3941–1.3942.

|  | Percent C | Percent Si | Percent H | Bromine Number |
|---|---|---|---|---|
| Found | 38.9 | 33.6 | 9.3 | .99 |
| Theoretical | 43.6 | 33.9 | 9.7 | .72 |

EXAMPLE 5

*Preparation of vinylpentamethyldisiloxane*

[(Me$_3$)SiOSi(Me)$_2$CH=CH$_2$] *by addition of pentamethyldisiloxane to acetylene*

Employing a procedure similar to that described in Example 4, pentamethyldisiloxane, in amount 300 milliliters, was injected into an atmosphere of acetylene (245 p.s.i.g.), tetrahydrofuran (200 ml.), and 2.5 grams of platinum-on-gamma-alumina at 130° C. Vinylpentamethyldisiloxane, in amount 136 grams (51.5%), was isolated. A residue amounting to 11.0 grams was also obtained. The desired adduct yielded the following physical and analytical data:

Boiling point _____ 120–120.5° C.
Refractive index ($n_D^{25}$) _____ 1.3920–1.3930.

|  | Percent C | Percent Si | Percent H |
|---|---|---|---|
| Found | 46.6 | 35.0 | 9.7 |
| Theoretical | 48.0 | 32.0 | 10.8 |

Unsaturation of this compound was clearly demonstrated by infrared analysis, and by the fact that vinyl acetate, acrylonitrile, and styrene were successfully copolymerized with the compound.

The data for Examples 1 through 5 are summarized within the following table for convenient reference:

(II) UNSATURATED HYDROCARBONS CONTAINING FUNCTIONAL ETHER GROUPS (VINYL UNSATURATION)

EXAMPLE 6

*Preparation of beta-(2-methoxyethoxy)ethyl-bis(trimethylsiloxy)methylsilane*

[(Me$_3$SiO)$_2$Si(Me)(CH$_2$)$_2$O(CH$_2$)$_2$OCH$_3$]

*by addition of heptamethyltrisiloxane to vinylmethyl "Cellosolve"* [*(2-methoxyethoxy)ethylene*]

A 500 cubic centimeter, three-necked flask equipped with stirrer, thermometer and reflux condenser, was charged with 155 grams (0.7 mole) of heptamethyltrisiloxane, 41 grams (0.4 mole) of vinylmethyl "Cellosolve," and 1.96 grams of one percent platinum-on-gamma-alumina catalyst (1 wt. percent). The reaction mixture was heated with stirring from 120–145° C. for two and one-half hours. After this period, the flask and its contents were cooled to room temperature and the catalyst was removed by centrifuging. Upon distillation of the products, there was obtained 95.5 grams of low boilers, 4.5 grams of residues, and 87 grams of the desired adduct. The compound yielded the following physical and analytical data:

Boiling point _____ 70–72° C./0.5 mm. Hg.
Refractive index ($n_D^{25}$) _____ 1.4093.

|  | Percent C | Percent Si | Percent H |
|---|---|---|---|
| Found | 25.2 | 44.4 | 10.6 |
| Theoretical | 25.9 | 47.2 | 9.8 |

EXAMPLE 7

*Preparation of beta-chloroethoxyethyl-bis(trimethylsiloxy)methylsilane* [(Me$_3$SiO)$_2$Si(Me)(CH$_2$)$_2$O(CH$_2$)$_2$Cl] *by addition of heptamethyltrisiloxane to vinyl-2-chloroethyl ether* [*(2-chloroethoxy)ethylene*]

A 500 cubic centimeter, round-bottom flask equipped with a stirrer, condenser and thermometer, was charged with 122 grams of heptamethyltrisiloxane (0.55 mole), 53.3 grams of vinyl-2-chloroethyl ether (0.5 mole) and 1.75 grams (1 wt.-percent of two percent platinum-on-gamma-alumina catalyst. The mixture was heated at 105–110° C. with stirring for a total elapsed period of four hours. The catalyst was removed from the reaction product by centrifuging. Distillation of the product yielded the desired adduct,

[(CH$_3$)$_3$SiO]$_2$Si(CH$_3$)—CH$_2$CH$_2$—O—CH$_2$CH$_2$Cl in amount of 73.3 grams (71% yield based on reacted CH$_2$=CH—O—CH$_2$CH$_2$Cl). The compound yielded the following physical and analytical data:

Boiling point _____ 127° C./9 mm.
Refractive index ($n_D^{25}$) _____ 1.4163–1.4180.

TABLE II
*Addition of siloxanes to unsaturated hydrocarbons*

| Example | Siloxane (moles) | Olefin (moles) | Catalyst 1% Pt-on-Al$_2$O$_3$ (wt. percent) | Temp. (° C.) | Time (hr.) | Yield of Adduct (mole percent) | Formula of Adduct |
|---|---|---|---|---|---|---|---|
| 1* | 0.5 Me$_3$SiO(MeSiHO)SiMe$_3$ | 0.3 octene-1 | 0.5 wt.-percent of 5% Pt-on-charcoal. | 130–140 | 3 | 88 | |
| 1* | 0.5 Me$_3$SiO(MeSiHO)SiMe$_3$ | 0.4 octene-1 | 1 | 120–160 | 1 | 80 | (MeSiO)$_2$Si(Me)C$_{18}$H$_{17}$ |
| 2** | 0.4 Me$_3$SiO(MeSiHO)SiMe$_3$ | do | 0 | 175 | 7 | 3 | |
| 2** | 0.4 Me$_3$SiO(MeSiHO)SiMe$_3$ | do | 0 | 225 | 7 | 4 | |
| 3* | 0.03[(Me$_2$SiO)$_{15}$H$_2$SiO]$_x$ | 1.2 octene-1 | 0.5 | 120 | 3.0 modified polymer | | [(Me$_2$SiO)$_{15}$(C$_8$H$_{17}$)$_2$SiO]$_x$ |
| 4** | 0.72 Me$_3$SiO(MeSiHO)SiMe$_3$ | 194 p.s.i.g. CH≡CH | 1 | 130 | 2.5 | 66 | (Me$_3$SiO)$_2$Si(Me)CH=CH$_2$ |
| 4** | 1.1 Me$_3$SiO(MeSiHO)SiMe$_3$ | 388 p.s.i.g. CH≡CH | 1 | 130 | 3.0 | 51.5 | |
| 5* | Me$_3$SiOSiMe$_2$H | 245 p.s.i.g. CH≡CH | | | | 51.5 | Me$_3$SiOSiMe$_2$CH=CH$_2$ |

*Indicates reactions carried out at reflux temperatures.
**Indicates reactions carried out in a 300 c. stainless steel pressure vessel.

Pure [(CH$_3$)SiO]$_2$Si(CH$_3$)—CH$_2$CH$_2$—O—CH$_2$CH$_2$Cl has the boiling point 127–128° (9.0 mm.); refractive index ($n_D^{25}$) of 1.4180; and density ($d_{25}$) of 0.927.

|  | Percent Cl |
|---|---|
| Found | 11.17 |
| Theoretical (C$_{11}$H$_{29}$O$_3$SiCl) | 10.80 |

EXAMPLE 8

*Preparation of trimethylsilyl-endblocked stearyloxyethyl-methyl-polysiloxane*

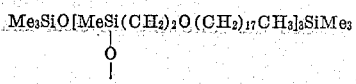

*by addition of bis(trimethylsiloxy)tris(methyl, hydrogen siloxane)* [Me$_3$SiO(SiMeHO)$_3$SiMe$_3$] *to vinylstearyl ether*

Into a one-liter flask equipped with a stirrer, reflux condenser, and thermometer were charged 296 grams (1 mole) of CH$_2$=CHO(CH$_2$)$_{17}$CH$_3$, 94 grams (0.27 mole) of Me$_3$SiO(SiMeHO)$_3$SiMe$_3$, and 3 grams of one percent platinum-on-gamma-alumina catalyst. The reaction mixture was heated at 150–160° C. with stirring for eight hours. On cooling to room temperature the products congealed to a waxy solid. The products were dissolved in 300 cubic centimeters of benzene, the catalyst removed by centrifuging the solution thus produced, and the benzene was then removed by distillation to 130° C. The products were then vacuum stripped. Vinylstearyl ether, in amount 62 grams, was distilled at a head temperature of 130–150° C. at 0.3 mm. pressure, and with a kettle temperature of 155–175° C., 308 grams of the desired adduct

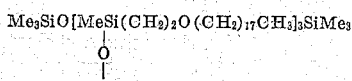

were recovered as a waxy solid.

Proof of the reaction was demonstrated by the fact that only 62 grams of unreacted vinylstearyl ether could be removed from the reaction mixture, whereas the calculated excess at the start of the reaction was 56 grams.

Analysis for silanic hydrogen in the waxy product showed 12 cubic centimeters per gram, while the theoretical silanic hydrogen for the mixture if no reaction had occurred is 73 cubic centimeters per gram. These data establish the yield of adduct at 83 percent of theoretical.

(III) UNSATURATED HYDROCARBONS CONTAINING FUNCTIONAL ESTER GROUPS (VINYL UNSATURATION)

EXAMPLE 9

*Preparation of beta-carbomethoxyethyl-bis(trimethylsiloxy)methylsilane*

[(Me$_3$SiO$_2$)Si(Me)(CH$_2$)$_2$COOCH$_3$]

*by addition of bis(trimethylsiloxy)methylsilane to methyl acrylate:*

With methyl acrylate, an adduct was isolated in 25 percent yield and considerable amounts of high boiling compounds were formed. One such high boiler corresponded by analysis to (Me$_3$SiO)$_2$Si(Me)OSi(Me)(OSiMe$_3$)$_2$ It would seem from the results of this work that ester substituents located in beta position to silicon are relatively unstable and subject to decomposition.

Into a one liter flask equipped with stirrer, reflux condenser, and dropping funnel, were charged 111 grams (0.5 mole) of (Me$_3$SiO)$_2$SiMeH and 1.5 grams of one percent platinum-on-gamma-alumina catalyst. After heating the mixture to 140° C., 69 grams (0.8 mole) of CH$_2$=CHCOOCH$_3$ was added via the dropping funnel over a period of four hours. The resulting mixture was heated for an additional five hours at 140–150° C. The reaction mixture was then cooled to room temperature and centrifuged to remove the catalyst. Fractionation of the products yielded 39 grams (25 mole-percent yield) of (MeSiO)$_2$Si(Me)(CH$_2$)$_2$COOMe. The adduct yielded the following physical and analytical data:

Boiling point _____ 40–42° C./0.2 mm.
Refractive index ($n_D^{25}$) _____ 1.4046.

|  | Percent C | Percent Si | Percent H | Saponification equivalent, meq. per gram |
|---|---|---|---|---|
| Found | 41.2 | 27.2 | 8.9 | 3.1 |
| Theoretical | 42.8 | 27.2 | 9.1 | 3.2 |

EXAMPLE 10

*Preparation of beta-acetoxyethyl-bis(trimethylsiloxy)-methylsilane* [(Me$_3$SiO)$_2$Si(Me)CH$_2$CH$_2$OOCCH$_3$] *by addition of bis(trimethylsiloxy)methylsilane to vinyl acetate:*

Into a 300 cubic centimeter steel bomb were charged 111 grams (0.5 mole) of heptamethyltrisiloxane, 34.4 grams (0.4 mole) of vinyl acetate, and 2.9 grams (2. wt.-percent) of two percent platinum-on-gamma-alumina. The vessel was rocked at 175° C. for a period of six hours. The contents of the bomb were removed and the catalyst separated by use of a centrifuge. Fractionation of the material yielded 79.0 grams (25.6% yield) of the desired adduct which had: boiling point 57–72° C./8.0 mm.; $n_D^{25}$=1.3902–1.3929. After redistillation, the following physical and analytical data were obtained with the adduct:

Boiling point _____ 72° C./8.0 mm.
Refractive index ($n_D^{25}$) _____ 1.3919.

|  | Percent C | Percent Si | Percent H | Saponification Number |
|---|---|---|---|---|
| Found | 39.2 | 28.5 | 10.3 | 199 |
| Theoretical (C$_{11}$H$_{28}$O$_4$Si$_3$) | 42.8 | 27.3 | 9.9 | 182 |

(IV) UNSATURATED HYDROCARBONS CONTAINING FUNCTIONAL ACETAL OR ALDEHYDE GROUPS (VINYL UNSATURATION)

It was found that silicon compounds containing aldehyde groups can be prepared by the addition of Si—H to acetal derivatives of the unsaturated aldehydes followed by hydrolysis of the acetal adduct. Acrolein was converted to the acetal by reaction with ethyl orthoformate. The acrolein acetal reacted well with (Me$_3$SiO)$_2$Si(Me)H at 140° C. to yield the adduct at approximately 70 percent of theoretical yield. Hydrolysis of the acetal adduct was carried out in tetrahydrofuran solvent at 70° C. with dilute hydrochloric acid. The total synthesis is illustrated by the following equations:

(a) CH$_2$=CHCHO+HC(OEt)$_3$→
        CH$_2$=CHCH(OEt)$_2$+HCOOEt

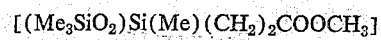

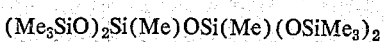

EXAMPLE 11

*Preparation of gamma, gamma-diethoxypropyl-bis(trimethylsiloxy)methylsilane*
[(Me$_3$SiO)$_2$Si(Me)(CH$_2$)$_2$CH(OEt)$_2$] *by addition of Heptamethyltrisiloxane to acrolein acetal*

Into a one-liter, three-necked flask equipped with stirrer, reflux condenser and thermometer, there were placed 222 grams (1 mole) of heptamethyltrisiloxane, 75 grams (0.58 mole) of acrolein acetal, and 1.5 grams (0.8 wt.-percent) of one percent platinum-on-gamma-alumina catalyst. The reaction mixture was heated with stirring at 130–140° C. At 140° C. an exothermic reaction ensued and it became necessary to remove heat from the flask. After a few minutes the reaction subsided and heating was continued at 145° C. for one-half hour. Following this heating period, the flask and its contents were cooled to room temperature and the catalyst was removed by filtering. Upon distillation of the products, there was obtained 120 grams of low boilers, 8 grams of residues, and 146 grams of the desired adduct. The compound yielded the following physical and analytical data:

Boiling point _____ 88–92° C./0.7 mm. Hg.
Refractive index ($n_D^{25}$) _____ 1.4077.

|  | Percent C | Percent Si | Percent H |
|---|---|---|---|
| Found | 50.1 | 22.9 | 11.3 |
| Theoretical | 45.0 | 23.8 | 10.0 |

EXAMPLE 12

*Preparation of beta - formylethyl - bis(trimethylsiloxy) methylsilane [(Me₃SiO)₂Si(Me)(Ch₂)₂CHO] by hydrolysis of the heptamethyltrisiloxane acrolein acetal adduct of Example 11*

Into a 250 cubic centimeter flask equipped with a reflux condenser, there were placed 39.9 grams (0.11 mole) of the acrolein acetal adduct of heptamethyltrisiloxane, 45 grams of tetrahydrofuran as solvent, and 10 cubic centimeters of a one percent aqueous solution of hydrogen chloride. The mixture was refluxed for 6 hours at 75° C. Following this treatment, the products were neutralized with aqueous sodium bicarbonate, desolvated and distilled under reduced pressure through a fractionating column. From the distillation, there were obtained 5 grams of the desired silicon aldehyde, and 16 grams of high boiling products. The adduct yielded the following physical and analytical data:

Boiling point _____ 58–60° C./0.5 mm.
Refractive index ($n_D^{25}$) _____ 1.4085.

|  | Percent C | Percent Si | Percent H |
|---|---|---|---|
| Found | 43.1 | 28.4 | 9.6 |
| Theoretical | 43.1 | 30.1 | 9.3 |

The 2,4-dinitrophenylhydrazone derivative of the aldehyde had a melting point of 73–75° C. The 2,4-dinitrophenylhydrazone prepared directly from the acrolein acetal-heptamethyltrisiloxane adduct, melted at 73–74° C. and contained 13.5% Si. (Theory Si=17.9%).

EXAMPLE 13

*Preparation of beta-methylvinyloxy-bis(trimethylsiloxy)-methylsilane[Me₃SiO)₂Si(Me)OCH=CHCH₃] by addition of heptamethyltrisiloxane to acrolein*

Although the unsaturated aldehydes, crotonaldehyde and acrolein reacted with heptamethyltrisiloxane, the adducts formed were not those expected from addition to the carbon-carbon double bond. This was indicated by the fact that the 2,4-dinitrophenylhydrazones prepared contained no silicon but were the derivatives of propionaldehyde and butyraldehyde. 1,4-addition to the carbonyl group occurred.

≡Si—H+C=C—C=O→CH—C=C—O—Si≡ (1,4 addition)

Into a one-liter, three-necked flask equipped with stirrer, thermometer and reflux condenser were charged 222 grams (1 mole) of heptamethyltrisiloxane and 36 grams (0.64 mole) of acrolein, 1 gram of PANA (inhibitor), and 2 grams of one percent platinum-on-gamma-alumina catalyst. The mixture was heated for seven (7) hours with stirring from 60–115° C. At the end of this time, the flask and its contents were cooled to room temperature and the products centrifuged to remove the catalyst. Upon distillation of the products there were obtained 106 grams of low boilers, 52 grams of high boilers, 12.5 grams of residues, and 60 grams of the desired adduct. The compound yielded the following physical and analytical data:

Boiling point _____ 189–191° C. (760 mm.)
Refractive index ($n_D^{25}$) _____ 1.3970.

|  | Percent C | Percent Si | Percent H |
|---|---|---|---|
| Found | 42.6 | 30.7 | 9.6 |
| Theoretical | 43.1 | 30.1 | 9.3 |

EXAMPLE 14

*Preparation of beta-ethylvinyloxy-bis(trimethylsiloxy)-ethylsilane[(Me₃SiO)₂Si(Et)OCH=CHCH₂CH₃] by addition of bis(trimethylsiloxy)ethylsilane to crotonaldehyde*

Into a 500 cubic centimeter flask equipped with reflux condenser, stirrer, and nitrogen inlet tube, were charged 47.5 grams (0.2 mole) of (Me₃SiO)₂SiEtH, 42 grams (0.6 mole) of CH₃CH=CHCHO, and 0.9 gram of one percent platinum-on-gamma-alumina catalyst. The mixture was heated under a nitrogen atmosphere with stirring for nine (9) hours at 100–150° C. It was then cooled to room temperature and centrifuged to remove the catalyst. Upon stripping to 120° C. at 1 mm. there was obtained 84 grams of volatile product. Fractionation of the volatile material gave 47 grams (77 mole-percent yield) of (Me₃SiO)₂Si(Et)OCH=CHCH₂CH₃. Identity of the adduct was established by the fact that it hydrolyzed during preparation of the 2,4-dinitrophenylhydrazone derivative, and the derivative formed was that of butyraldehyde. The adduct yielded the following physical and analytical data:

Boiling point _____ 55–57° C./0.5 mm.
Refractive index ($n_D^{25}$) _____ 1.4076.

|  | Percent C | Percent Si | Percent H |
|---|---|---|---|
| Found | 46.6 | 26.0 | 10.4 |
| Theoretical | 46.4 | 27.3 | 9.8 |

(V) UNSATURATED HYDROCARBONS CONTAINING FUNCTIONAL ETHER GROUPS (ALLYL UNSATURATION)

EXAMPLE 15

*Preparation of gamma - glycidoxypropyl - bis(trimethylsiloxy)-methylsilane*

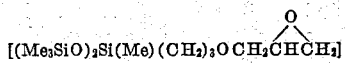

by addition of heptamethyltrisiloxane to allylglycidyl ether

Into a one-liter flask equipped with stirrer and reflux condenser, there were charged 122.1 grams (0.55 mole) of (Me₃SiO)₂SiMeH, 57 grams (0.5 mole) of

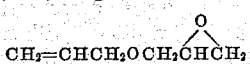

and 1.8 grams of one percent platinum-on-gramma-alumina catalyst. The mixture was heated with stirring at 150° C. for two and one-half hours. It was thereafter cooled to room temperature and filtered to remove the catalyst. The crude products were stripped to 120° C. at 0.5 mm. yielding 160 grams of volatile products.

Fractionation of these products yielded 95 grams (56.5 mole-percent yield) of the desired adduct. The compound yielded the following physical and analytical data:

Boiling point _____ 94–98° C./0.2 mm.
Refractive index ($n_D^{25}$) _____ 1.4200.

|  | Percent C | Percent Si | Percent H | Epoxy Equiv. |
|---|---|---|---|---|
| Found | 46.2 | 24.8 | 9.5 | 3.5 |
| Theoretical | 46.4 | 25.0 | 9.2 | 3.6 |

Example 16

*Preparation of a linear allyl ether-silicone copolymer—*

$$\left[\begin{array}{cc} SiMe_3 & SiMe_3 \\ | & | \\ O & O \\ | & | \\ -Si-OSi(CH_2)_3O(CH_2)_3- \\ | & | \\ Et & Et \end{array}\right]_n$$

*by addition of bis(trimethylsiloxy)-bis(ethyl, hydrogen siloxane) [Me₃SiO(EtSiHO)₂SiMe] to diallyl ether*

Into a 500 cubic centimeter flask equipped with stirrer and reflux condenser, there were charged 62 grams (0.2 mole) of Me₃SiO(EtSiHO)₂SiMe₃, 19.6 grams (0.2 mole) of [CH₂=CHCH₂]₂O, and 0.8 gram of one percent platinum-on-gamma-catalyst. The mixture was heated with stirring for twelve hours at 150–160° C. After cooling to room temperature and removal of the catalyst by filtration, there was collected 74.5 grams of a viscous oil. This material was heated to 200° C. at 0.5 mm. to remove low boiling products. The residual material was a linear polymer weighing 62.5 grams and having a viscosity of 110 centistokes at 25° C. The polymer yielded the following analytical data:

|  | Percent Si | Hydrolyzable Hydrogen, cc./g. |
|---|---|---|
| Found | 26.0 | 1.4 |
| Theoretical | 27.4 | 0 |

(VI) UNSATURATED HYDROCARBONS CONTAINING FUNCTIONAL ESTER GROUPS (ALLYL UNSATURATION)

Example 17

*Preparation of gamma-acetoxypropyl-bis(trimethylsiloxy)-methylsilane [(Me₃SiO)₂Si(Me)(CH₂)₃OOCCH₃] by addition of heptamethyltrisiloxane to allyl acetate*

Heptamethyltrisiloxane added to allyl acetate using a platinum catalyst. Side reactions occurred—

$$(Me_3SiO)_2Si(Me)H + CH_2=CHCH_2O\overset{O}{\overset{\|}{C}}CH_3 \longrightarrow$$
$$(Me_3SiO)_2Si(Me)(CH_2)_3OOCCH_3$$

and probably account for the relatively low yields for this addition. The reaction of allyl acetate with heptamethyltrisiloxane yielded propylene and the acetoxy derivative—

$$(Me_3SiO)_2Si(Me)O\overset{O}{\overset{\|}{C}}-CH_3$$

as well as the normal adduct. This side product was probably formed as a result of decomposition of a portion of the normal adduct, presumably the alpha-isomer. The decomposition is depicted by the following skeletal equations:

(a)
$$\equiv Si-H + CH_2=CHCH_2O\overset{O}{\overset{\|}{C}}-CH_3 \longrightarrow Si\overset{CH_3}{\overset{|}{C}}H-CH_2O\overset{O}{\overset{\|}{C}}-CH_3 \longrightarrow$$
$$\equiv Si-O-\overset{O}{\overset{\|}{C}}-CH_3 + CH_3CH=CH_2$$

Alpha addition (unstable)

(b)
$$\equiv Si-H + CH_2=CHCH_2O\overset{O}{\overset{\|}{C}}-CH_3 \longrightarrow \equiv Si(CH_2)_3O\overset{O}{\overset{\|}{C}}-CH_3$$

Beta addition (stable)

Into a 500 cubic centimeter, three-necked flask equipped with stirrer, reflux condenser and thermometer, there were charged 70 grams (0.7 mole) of allyl acetate, 66 grams (0.3 mole) of heptamethyltrisiloxane, and 1 gram of one percent platinum-on-gamma-alumina catalyst. The mixture was heated from 110–150° C. with stirring for twelve (12) hours. After this period of heating, a total of 7 cubic centimeters of liquified gas collected from the reaction in a trap was cooled in an acetone-Dry Ice bath. The boiling point of this condensible gas was −48 to −46° C. (propylene boiling point=−46° C.). The flask and its contents were cooled to room temperature and the liquid products were filtered to remove the catalyst. Upon rectification of the products, there were obtained 31 grams of low boilers, 21 grams of $$(Me_3SiO)_2Si(Me)O\overset{O}{\overset{\|}{C}}-CH_3$$

(B.P. 38–40° C./0.8 mm. Hg; $n_D^{25}$=1.3910) and 51.5 grams of the adduct, $$(Me_3SiO)_2Si(Me)(CH_2)_3OOC-CH_3$$

(B.P. 67–70° C./0.8 mm. Hg; $n_D^{25}$=1.4098; saponification equiv. 3.1 meq./g.—theory—3.1 meq./g.) and 5.5 grams of residues. Analysis of the desired adduct yielded the following data:

|  | Percent C | Percent Si | Percent H |
|---|---|---|---|
| Found | 44.3 | 25.2 | 9.4 |
| Theoretical | 44.7 | 26.0 | 9.3 |

(VII) UNSATURATED HYDROCARBONS CONTAINING FUNCTIONAL ALCOHOL GROUPS (ALLYL UNSATURATION)

Example 18

*Preparation of gamma-hydroxypropyl-bis(trimethylsiloxy)-ethylsilane [(Me₃SiO)₂Si(ET)(CH₂)₃OH] by addition of bis-(trimethylsiloxy)ethylsilane to allyl alcohol:*

Into a 500 cubic centimeter flask equipped with stirrer and reflux condenser, there were charged 95 grams (0.4 mole) of (Me₃SiO)₂Si(Et)H, 46.5 grams (0.8 mole) of CH₂=CHCH₂OH, and 1.4 grams of one percent platinum-on-gamma alumina catalyst, all under a nitrogen blanket. The mixture was heated at 100° C. to 145° C. for ten hours. After cooling to room temperature, the catalyst was removed by filtration and 107.5 grams of products were distilled. Upon fractionating there was obtained 98 grams (83 mole-percent yield) of the desired adduct. The compound yielded the following physical and analytical values:

Boiling point _____ 82–86° C./0.8 mm.
Refractive index ($n_D^{25}$) _____ 1.4186.

|  | Percent C | Percent Si | Percent H | Percent OH |
|---|---|---|---|---|
| Found | 43.4 | 28.3 | 10.1 | 5.8 |
| Theoretical | 44.9 | 28.5 | 10.2 | 8.3 |

Example 19

*Preparation of gamma-hydroxypropyl-bis(trimethylsiloxy)methylsilane [(Me₃SiO)₂Si(Me)(CH₂)₃OH] by addition of heptamethyltrisiloxane to allyl alcohol:*

Into a one-liter, three-necked flask equipped with reflux condenser, stirrer and thermometer, there were charged 111 grams (0.5 mole) of heptamethyltrisiloxane, 23.2 grams (0.4 mole) of allyl alcohol, and 1.5 grams (1 wt.-percent) of one percent platinum-on-gamma-alumina catalyst. The flask and its contents were heated with stirring for a period of one and one-half hours over a temperature range of 100–150° C. Following this heating, the products were cooled to room temperature and the catalyst removed by filtering. Upon distillation of the products, there were obtained 31.5 grams of low boilers, 81.6 grams of the desired adduct, and 12.2 grams of the residues. The compound yielded the following physical and analytical data:

Boiling point _____ 82–85° C./2 mm. Hg.
Refractive index ($n_D^{25}$) _____ 1.4133.

|  | Percent Si | Percent OH |
|---|---|---|
| Found | 29.8 | 7.1 |
| Theoretical | 30.0 | 6.1 |

The platinum-on-gamma-alumina-catalyzed addition reaction of heptamethyltrisiloxane to allyl alcohol was studied within the temperature range 75–150° C., and it was found that an optimum yield of product was obtained at 100° C. At 75° C. little or no reaction occurred, whereas at 125° C. and 150° C., an increase in gaseous by-products was observed accompanied by reduced yields of products. These gases were analyzed and identified as hydrogen and propylene with traces of methane also present.

The results of these investigations are presented in tabulated form below:

there was obtained 91 grams of a clear oil having a viscosity at 25° C. of 9.8 cs.

The reaction of the resulting Si-H-endblocked polymer with allyl alcohol was carried out to yield an OH-endblocked siloxane. Thus, into a 500 milliliter flask equipped with a thermometer, reflux condenser and magnetic stirrer, there were charged 71.5 grams (0.07 mole) of the Si-H-endblocked polymer, 29 grams (0.5 mole) of allyl alcohol, and 1.0 gram of one percent by weight platinum-on-gamma-alumina catalyst. The reactants were heated at reflux (95–113° C.) for eleven (11) hours. After filtering and removing the excess allyl alcohol under reduced pressure, there was obtained 75.0 grams of a clear oil having a viscosity at 25° C. of 53.6 cs. The polymer was found to contain 2.55 percent OH (theory=2.98%).

EXAMPLE 25

*Preparation of trimethylsilyl-endblocked hydroxypropyl-methylsiloxane-dimethylsiloxane copolymer*

[Me₃SiO]MeSi((CH₂)₃OH)][Me₂SiO]ₓSiMe₃]

*by equilibration of gamma-hydroxypropyl-bis(trimethylsilane with octamethylcyclotetrasiloxane*

The use of bis(trimethylsiloxy)gamma-hydroxypropylmethylsilane as an endblocker for the preparation of siloxane oils containing hydroxypropyl groups was succecfully demonstrated. A series of polymers containing varying amounts of endblocker were prepared and the viscosity of the oil was found to be a function of the amount of endblocker employed. This work demonstrates a method for increasing the molecular weight of

TABLE III

*Effect of temperature on the reaction [1] of allyl alcohol with heptamethyltrisiloxane*

| Example No. | Conc. or Reactants (Moles) | Temp. (° C.) | Pressure [4] (p.s.i.) Developed at— Temp. | Pressure [4] (p.s.i.) Developed at— Res. Press. | Yield of Adduct (Mole percent) | Recovered Starting Materials [5] Allyl Alcohol (Moles) | Recovered Starting Materials [5] Me₃SiO(MeSiHO)SiMe₃ (Moles) |
|---|---|---|---|---|---|---|---|
| 20[2] | 0.4 Me₃SiO(MeSiHO)SiMe₃ / 0.5 CH₂=CHCH₂OH | 75 | | | 0 to 6 | | |
| 21[3] | 0.4 Me₃SiO(MeSiHO)SiMe₃ / 0.5 CH₂=CHCH₂OH | 100 | | | 55 | 0.2 | 0.09 |
| 22[3] | 0.6 Me₃SiO(MeSiHO)SiMe₃ / 0.7 CH₂=CHCH₂OH | 125 | 100 | 15 | 32 | 0.54 | 0.25 |
| 23[3] | 0.6 Me₃SiO(MeSiHO)SiMe₃ / 0.7 CH₂=CHCH₂OH | 150 | 100 | 20 | 25–32 | | |

Superscript references:
[1] All experiments were carried out for 6 hr. with 1 wt.-percent of 1% Pt-on-gamma alumina catalyst.
[2] Experiments in which the yield was calculated as the crude adduct, which was stripped up to the distillation temperature.
[3] Experiments in which the yield was calculated from the distilled product.
[4] The gas was found to consist of 5 parts hydrogen to 1 part propylene with traces of methane also present.
[5] Some Me₃SiOSiMe₃ was observed in allyl alcohol fractions. Traces of CH₂=CHCHO also found in lights.

EXAMPLE 24

*Preparation of bis(gamma-hydroxypropyl) - endblocked dimethylpolysiloxane*

[HO(CH₂)₃Si(Me)₂O(SiMe₂O)₁₂Si(Me)₂(CH₂)₃OH]

*by addition of bis(hydrogen)-endblocked dimethylpolysiloxane [HMe₂SiO(SiMe₂O)₁₂SiMe₂H] to allyl alcohol*

An SiH-endblocked dimethylsiloxane having the calculated structure indicated above was prepared by equilibrating 88.8 grams (0.3 mole) of dimethylsiloxane cyclic tetramer and 13.4 grams (0.1 mole) sym-dihydrogentetramethyldisiloxane for twenty-four hours at room temperature using 1.0 gram of 100 percent sulfuric acid as catalyst. After washing out the sulfuric acid catalyst the adduct of Example 19, (Me₃SiO)₂Si(Me)(CH₂)₃OH, by equilibration with (Me₂SiO)₄.

Thus, in a typical example, a 25 x 200 millimeter test tube was charged with 11.84 grams (0.04 mole) of dimethylsiloxane cyclic tetramer, 2.80 grams (0.01 mole) of bis(trimethylsiloxy)gamma - hydroxypropylmethylsilane, and 0.042 grams of potassium silanolate catalyst (containing 4.0 wt–percent K). The test tube was stoppered tightly and heated in a constant temperature oil bath at 150° C. for six (6) hours. After cooling the resulting polymer, there was obtained 14 grams of a clear oil having a calculated molecular weight of 1464.

The following tabulated data illustrate the various polymers prepared by the foregoing technique.

TABLE IV

Equilibration of $(Me_3SiO)_2Si(Me)(CH_2)_3OH$ with $(Me_2SiO)_4$ at 150°C. for six hours using 0.3 wt.-percent $KO(Me_2SiO)_xK$ of 4.0 percent by weight potassium as catalyst

| Example No. | Moles $(Me_2SiO_4)_4$ per Mole of endblocker | Molecular Weight (calculated) | Viscosity in Cs. at 25° C. |
|---|---|---|---|
| 26 | 2 | 872 | 13.2 |
| 27 | 4 | 1,464 | 25.3 |
| 28 | 8 | 2,648 | 50.2 |
| 29 | 16 | 5,016 | 111.9 |
| 30 | 25 | 7,680 | 199.3 |

EXAMPLE 31

Preparation of 1-trimethylsiloxy-1-methyl-1,2-siloxacyclopentane

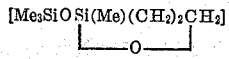

The thermal and catalytic dehydration of the allyl alcohol adduct of heptamethyltrisiloxane of Example 19 was investigated. This product can be isolated without difficulty by distillation at reduced pressures. On heating the adduct to 200–210° C., however, or using an alkaline catalyst at a lower temperature, dehydration proceeds readily to yield the cyclic ester. The manner of decomposition and the products recovered are illustrated by the following equation:

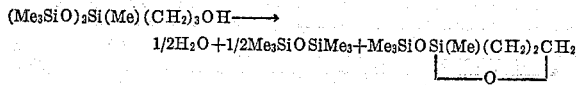

These cyclic esters are very reactive and polymerize readily on contact with moisture and are useful intermediates for preparing new types of silicone polymers.

Thus, into a 250 cubic centimeter flask connected to a fractionating column there was placed 54 grams (0.19 mole) of $(Me_3SiO)_2SiMe(CH_2CH_2CH_2OH)$. The compound was heated at 210–260° C. for six (6) hours during which time the following fractions were collected at the head of the column:

| Fraction | B. P., °C. | Wt. (g.) | $n_D^{25}$ | Cryoscopic Mol. wt. |
|---|---|---|---|---|
| 1 | 98–103 | 9.5 | 1.3848 | |
| 2 | 103–154 | 21 | | |
| 3 | 154–156 | 15 | 1.4260 | 209 (theory 190) |
| Res. | | 7 | | |

Fraction 3 was identified as the compound,

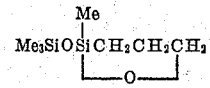

Analysis also showed:      Molar refract.
    Found _____ 51.84
    Theoretical _____ 52.18

This product can also be prepared from

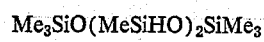

and allyl alcohol by dehydration and rearrangement at 110° C. in the presence of an alkaline catalyst such as potassium hydroxide.

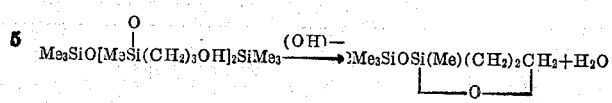

EXAMPLE 32

Preparation of 1,1-dimethyl-1,2-siloxacyclopentane

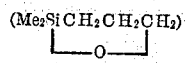

This compound was prepared by the procedure of Example 31, by the dehydration of $HO(CH_2)_3SiMe_2OSiMe_2(CH_2)_3OH$ which is the adduct of sym-tetramethyldisiloxane and allyl alcohol:

(a)   $HiSi(Me)_2OSi(Me)_2H + 2CH_2=CH-CH_2OH$
        $\rightarrow HO(CH_2)_3Si(Me)_2OSi(Me)_2(CH_2)_3OH$ (b)

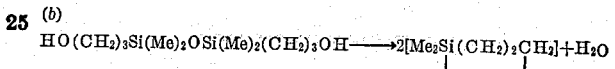

Thus, into a one-liter flask equipped with magnetic stirrer, thermometer and reflux condenser, there were charged 134 grams (1.0 mole) of $HMe_2SiOSiMe_2H$, 145 grams (2.5 moles) of $CH_2=CHCH_2OH$ and 1.5 grams of one percent by weight platinum-on-gamma-alumina catalyst. The mixture was heated to 76° C. at which point the temperature rose rapidly to 135° C. over a period of ten minutes. After cooling the reaction mixture to 73° C. it was heated an additional three hours between 73–102° C. The platinum catalyst was removed from the reaction mixture by filtration and the products distilled. Repeated fractionation of the products under reduced pressure (3.5 mm.) resulted in intramolecular dehydration of the allyl alcohol adduct at 100–130° C. The cyclic product,

reacted with the water evolved such that a pure material was not obtained in this manner. The cyclic product was isolated by dehydration of the allyl alcohol adduct (weight 60 grams) in refluxing toluene solution and removal of the water formed. Distillation of the cyclic compound from the toluene solution gave 42 grams (0.36 mole) of

or a yield of 18 mole percent. The compound yielded the following physical and analytical data:

Boiling point _____ °C__ 103–104
Refractive index ($n_D^{25}$) _____ 1.4190
Density ($d^{25}$) _____ 0.873

| | Percent C | Percent Si | Percent H | Cryoscopic Mol. Wt. | Molar Refract. |
|---|---|---|---|---|---|
| Found | 49.4 | 22.9 | 9.5 | 119 | 33.31 |
| Theoretical | 51.7 | 24.1 | 9.7 | 116 | 33.54 |

The following tabulated data summarize the additions of siloxanes to unsaturated alcohols:

TABLE V

*Additions of siloxanes to unsaturated alcohols*

| Example Reference Number | Reactants (Moles) | | Catalyst 1 percent Pt-on-Al₂O₃ (weight percent) | Temp. (° C.) | Time (Hr.) | Yield of Adduct (Mole per cent) |
|---|---|---|---|---|---|---|
| | Siloxane | Unsaturated Alcohol | | | | |
| 18 | 0.4 Me₃SiO(EtSiHO)SiMe₃ | 0.8 CH₂=CHCH₂OH | 1 | 100–150 | 10 | ᵃ 87 |
| 19 | 0.5 Me₃SiO(MeSiHO)SiMe₃ | 0.4 CH₂=CHCH₂OH | 1 | 105–140 | 1.5 | ᵇ 80 |
| 35 | 0.3 Me₃SiO(MeSiHO)SiMe₃ | 1 CH≡CCH₂OH 175 cc. of n-butyl ether as solvent | 1 | 110–120 | 16 | ᶜ 60 |
| 32 | 1 HMe₂SiOSiMe₂H | 2.5 CH₂=CHCH₂OH | 0.6 | 76–135 | 3 | (d) |
| None | 0.75 HMe₂SiOSiMe₃ | 1 CH₂=CHCH₂OHᵃ | 0.6 | 75–94 | 2.5 | ᵉ 14 |
| 31 | 0.2 Me₃SiO(MeSiHO)₂SiMe₃ | 1 CH₂=CHCH₂OH | 1 | 100–150 | 8 | (f) |

Superscript References (adduct yields):
ᵃ (Me₃SiO)₂Si(Et)(CH₂)₃OH.
ᵇ (Me₃SiO)₂Si(Me)(CH₂)₃OH.
ᶜ (Me₃SiO)₂Si(Me)CH=CHCH₂OH.
ᵈ Decomposed to Me₂Si(CH₂)₂CH₂.

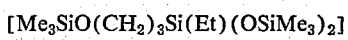

ᵉ (Me₃SiOSi(Me)₂OCH₂CH=CH₂.
ᶠ Decomposed to Me₃SiOSi(Me)(CH₂)₂CH₂.

UNSATURATED SILANE

EXAMPLE 33

*Preparation of gamma-trimethylsiloxypropyl-bis(trimethylsiloxy)ethylsilane*

[Me₃SiO(CH₂)₃Si(Et)(OSiMe₃)₂]

*by addition of bis(trimethylsiloxy)ethylsilane to trimethyl allyloxysilane*

The addition mechanism of the invention was also investigated in the reaction of a siloxane containing SiH with an unsaturated silane rather than with a pure organic compound as in the preceding examples.

(Me₃SiO)₂Si(Et)H + Me₃SiOCH₂CH=CH₂
→ (Me₃SiO)₂Si(Et)(CH₂)₃OSiMe₃

Thus, into a 500 cubic centimeter flask equipped with a stirrer, dropping funnel and inlet tube, were charged 71 grams (0.3 mole) of (Me₃SiO)₂Si(Et)H and 1 gram of one percent by weight platinum-on-gamma-alumina catalyst. The flask was placed in an oil bath at 145–150° C. and heated for 9.5 hours during which time 26 grams (0.2 mole) of Me₃SiOCH₂CH=CH₂ was added dropwise. The products were filtered and stripped to 150° C. at 1 mm. pressure. 83 grams of distillable products were recovered. Fractionation yielded 48 grams (66 mole percent yield) of the desired adduct. The compound yielded the following physical and analytical data:

Boiling point _____ 78–82° C./0.7 mm.
Refractive index ($n_D^{25}$) _____ 1.4113.

| | Percent Si | Mol. Wt. |
|---|---|---|
| Found | 30.2 | 355 |
| Theoretical | 30.6 | 366 |

UNSATURATED HYDROCARBONS CONTAINING FUNCTIONAL CYANO GROUPS (ALLYL UNSATURATION)

EXAMPLE 34

*Preparation of gamma-cyanopropyl-bis(trimethylsiloxy)methylsilane*

[(Me₃SiO)₂Si(Me)(CH₂)₃CN]

*by addition of heptamethyltrisiloxane to allyl cyanide*

Into a 300 cubic centimeter steel bomb were charged 122 grams (0.55 mole) of heptamethyltrisiloxane, 33.6 grams (0.5 mole) of allyl cyanide, and two percent by weight of platinum-on-gamma-alumina (2% Pt) catalyst. The vessel was rocked at 175° C. for a period of 4 hours. The bomb was rinsed with acetone, after which the combined solution was centrifuged to remove the catalyst. Distillation of the material yielded 19.5 grams of [(CH₃)₃SiO]₂Si(CH₃)—(CH₂)₃CN] (17.8% of theoretical yield based on recovered allyl cyanide). The adduct yielded the following physical and analytical data:

Boiling point _____ 68–78° C./0.6 mm.
Refractive index ($n_D^{25}$) _____ 1.4058.

| | Percent N | Percent Si |
|---|---|---|
| Found | 4.6 | 29.7 |
| Theoretical (C₁₁H₂₇O₂NSi₃) | 4.88 | 29.2 |

Pure [(CH₃)₃SiO]₂Si(CH₃)(CH₂)₃CN has the boiling point 74–75° C. (1.0 mm.); refractive index ($n_D^{25}$) 1.4038; and density ($d_{24}$) 0.884.

ACETYLENIC HYDROCARBON CONTAINING FUNCTIONAL HYDROXYL GROUP

EXAMPLE 35

*Preparation of beta(hydroxymethyl)vinyl-bis(trimethylsiloxy)methylsilane*

[(Me₃SiO)₂Si(Me)CH=CHCH₂OH]

*by addition of heptamethyltrisiloxane to propargyl alcohol*

Into a one-liter flask equipped with stirrer, condenser and thermometer there was charged 67 grams (0.3 mole) of (Me₂SiO)₂SiMeH and 56 grams (1 mole) of C≡CCH₂OH, together with 175 cubic centimeters of n-butyl ether to act as mutual solvent, and 1.1 grams of one percent platinum-on-gamma-alumina catalyst. Heating at reflux temperature (114–119° C.) was maintained for twenty hours. The products were filtered, desolvated, and stripped. 84 grams of volatile products and 6.5 grams of viscous residue was obtained. Fractionation of the products yielded 47.5 grams of the desired adduct (57 mole-percent yield). The compound yielded the following physical and analytical data:

Boiling point _____ 74–78° C. at 1 mm.
Refractive index ($n_D^{25}$) _____ 1.4210.

| | Percent C | Percent Si | Percent H | Percent OH |
|---|---|---|---|---|
| Found | 42.8 | 29.0 | 9.3 | 6.5 |
| Theoretical | 43.0 | 30.1 | 9.3 | 6.1 |

The reactions detailed within the foregoing examples are summarized within the following table for convenient reference:

example describes the addition of perfluoroalkyl 4-pentenoates and hexachlorobicycloheptenyl pentenoate to the hydrosiloxy groups of $(MeHSiO)_4$.

TABLE VI
*Summary of reactions and compositions*

| Example No. | Product | Siloxane Used | Organic Compound Used |
|---|---|---|---|
| 1 | Bis(trimethylsiloxy)octylmethylsilane $(Me_3SiO)_2Si(Me)(CH_2)_7CH_3$ | Heptamethyltrisiloxane $(Me_3SiO)_2Si(Me)H$ | Octene-1. |
| 3 | 15:1 Copolymer of dimethyl siloxane:dioctyl siloxane $[(Me_2SiO)_{15}(C_8H_{17})_2SiO]_x$ | Copolymer of 15:1 dimethyl-siloxane: dihydrogen siloxane $[(Me_2SiO)_{15}(H_2SiO)]_x$ | Octene-1. |
| 4 | Bis(trimethylsiloxy)vinylmethylsilane $(Me_3SiO)_2Si(Me)CH=CH_2$ | Heptamethyltrisiloxane $(Me_3SiO)_2Si(Me)H$ | Acetylene. |
| 5 | Vinylpentamethyldisiloxane $(Me_3SiOSi(Me)_2CH=CH_2$ | Pentamethyldisiloxane $Me_3SiOSi(Me)_2H$ | Acetylene. |
| 6 | Beta-(2-methoxyethoxy)ethyl-bis(trimethylsiloxy)methylsilane $(Me_3SiO)_2Si(Me)(CH_2)_2O(CH_2)_2OCH_3$ | Heptamethyltrisiloxane $(Me_3SiO)_2Si(Me)H$ | (2-methoxyethoxy)ethylene $CH_2=CHOCH_2CH_2OCH_3$ |
| 7 | Beta-chloroethoxyethyl-bis(trimethylsiloxy)methylsilane $(Me_3SiO)_2Si(Me)(CH_2)_2O(CH_2)_2Cl$ | Heptamethyltrisiloxane | (2-chloroethoxy)ethylene $CH_2=CHOCH_2CH_2Cl$ |
| 8 | Trimethylsilyl-endblocked stearyloxyethylmethylpolysiloxane (Mol. Wt. 1224) $Me_3SiO\left[\underset{\underset{O}{\mid}}{MeSi}(CH_2)_2O(CH_2)_{17}CH_3\right]_3 SiMe_3$ | Trimethylsilyl-endblocked methyl, hydrogen polysiloxane. | Vinylstearyl ether $CH_2=CHOC_{18}H_{37}$ |
| 9 | Beta-carbomethoxyethyl-bis(trimethylsiloxy(methylsilane $(Me_3SiO)_2Si(Me)(CH_2)_2COOCH_3$ | Heptamethyltrisiloxane $(Me_3SiO)_2Si(Me)H$ | Methyl acrylate $CH_2=CHCOOCH_3$ |
| 10 | Beta-acetoxyethyl-bis(trimethylsiloxy)methysilane $(Me_3SiO)_2Si(Me)CH_2CH_2OOCCH_3$ | Heptamethyltrisiloxane $(Me_3SiO)_2Si(Me)H$ | Vinyl acetate $CH_2=CHOOCCH_3$ |
| 11 | Gamma, gamma-diethoxypropyl-bis(trimethylsiloxy)methylsilane $(Me_3SiO)_2Si(Me)(CH_2)_2CH(OEt)_2$ | Heptamethyltrisiloxane $(Me_3SiO)_2Si(Me)H$ | Acrolein acetal $CH_2=CHCH(OEt)_2$ |
| 12 | Beta-formylethyl-bis(trimethylsiloxy)methylsilane $(Me_3SiO)_2Si(Me)(CH_2)_2CHO$ | Heptamethyltrisiloxane $(Me_3SiO)_2Si(Me)H$ | Acrolein acetal $CH_2=CHCH(OEt)_2$ |
| 13 | Beta-methylvinyloxy-bis(trimethylsiloxy)methylsilane $(Me_3SiO)_2Si(Me)OCH=CHCH_3$ | Heptamethyltrisiloxane $(Me_3SiO)_2Si(Me)H$ | Acrolein $CH_2=CHCHO$ |
| 14 | Beta-ethylvinyloxy-bis(trimethylsiloxy)ethylsilane $(Me_3SiO)_2Si(Et)OCH=CHCH_2CH_3$ | Bis(trimethylsiloxy)ethylsilane $(Me_3SiO)_2(Et)H$ | Crotonaldehyde $CH_3CH=CHCHO$ |
| 15 | Gamma-glycidoxypropyl-bis(trimethylsiloxy)-methylsilane $(Me_3SiO)_2Si(Me)(CH_2)_3OCH_2\overset{O}{\overset{\frown}{CHCH_2}}$ | Heptamethyltrisiloxane $(Me_3SiO)_2Si(Me)H$ | Allyl glycidyl ether $CH_2=CHCH_2OCH_2\overset{O}{\overset{\frown}{CHCH_2}}$ |
| 16 | Linear allyl ether-silicone copolymer $\left[\begin{array}{c}SiMe_3\ SiMe_3\\ \mid\ \ \ \ \ \ \ \ \ \ \mid\\ O\ \ \ \ \ \ \ \ \ \ O\\ \mid\ \ \ \ \ \ \ \ \ \ \mid\\ -Si-OSi(CH_2)_3O(CH_2)_3-\\ \mid\ \ \ \ \ \ \ \ \ \ \mid\\ Et\ \ \ \ \ \ \ \ Et\end{array}\right]_n$ | Bis(trimethylsiloxy)bis(ethyl-hydrogen siloxane) $Me_3SiO(EtSiHO)_2SiMe_3$ | Diallyl ether $[CH_2=CHCH_2]_2O$ |
| 17 | Gamma-acetoxypropyl-bis(trimethylsiloxy)methylsilane $(Me_3SiO)_2Si(Me)(CH_2)_3OOCCH_3$ | Heptamethyltrisiloxane $(Me_3SiO)_2Si(Me)H$ | Allyl acetate $CH_2=CHCH_2OOCCH_3$ |
| 18 | Gamma-hydroxypropyl-bis(trimethylsiloxy)ethylsilane $(Me_3SiO)_2Si(Et)(CH_2)_3OH$ | Bis(trimethylsiloxy)ethylsilane $(Me_3SiO)_2Si(Et)H$ | Allyl alcohol $CH_2=CHCH_2OH$ |
| 19 | Gamma-hydroxypropyl-bis(trimethylsiloxy)methylsilane $(Me_3SiO)_2Si(Me)(CH_2)_3OH$ | Heptamethyltrisiloxane $(Me_3SiO)_2Si(Me)H$ | Allyl alcohol $CH_2=CHCH_2OH$ |
| 24 | Gamma-hydroxypropyl-endblocked dimethylpolysiloxane $HO(CH_2)_3Si(Me)_2O(SiMe_2O)_{12}Si(Me)_2(CH_2)_3OH$ | Si-H-endblocked dimethylpolysiloxane $HSi(Me)_2O(Me_2SiO)_{12}SiMe_2H$ | Allyl alcohol $CH_2=CHCH_2OH$ |
| 25 | Trimethylsilyl-endblocked hydroxypropyl-methylsiloxane-dimethylsiloxane copolymer $Me_3SiO[MeSi((CH_2)_3OH)O][Me_2SiO]_xSiMe_3$ | Gamma - hydroxypropyl - bis(trimethylsiloxy)methylsilane $(Me_3SiO)_2Si(Me)(CH_2)_3OH$ | Octamethylcyclotetrasiloxane $(Me_2SiO)_4$ |
| 31 | 1-trimethylsiloxy-1-methyl-1,2 siloxacyclopentane $Me_3SiOSi(Me)(CH_2)_3CH_2$ $\phantom{Me_3SiOSi(Me)(C}\mid\phantom{H_2)_3CH}\mid$ $\phantom{Me_3SiOSi(Me)(C}\overline{\ \ \ \ O\ \ \ \ }$ | Heptamethyltrisiloxane $(Me_3SiO)_2Si(Me)H$ | Allyl alcohol $CH_2=CHCH_2OH$ |
| 32 | 1,1-dimethyl-1,2-siloxacyclopentane $Me_3Si(CH_2)_3CH_2$ $\phantom{Me_3Si(C}\mid\phantom{H_2)_3CH}\mid$ $\phantom{Me_3Si(C}\overline{\ \ \ \ O\ \ \ \ }$ | Sym-tetramethyldisiloxane $H(Me)_2SiOSi(Me)_2H$ | Allyl alcohol $CH_2=CHCH_2OH$ |
| 33 | Gamma-(trimethylsiloxy)propyl-bis(trimethylsiloxy)ethylsilane $\underset{\underset{Me_3SiO(CH_2)_3Si(OSiMe_3)_2}{\mid}}{Et}$ | Bis(trimethylsiloxy)ethylsilane $(Me_3SiO)_2Si(Et)H$ | Trimethylallyloxysilane $Me_3SiOCH_2CH=CH_2$ |
| 34 | Gamma-cyanopropyl-bis(trimethylsiloxy)methylsilane $(Me_3SiO)_2Si(Me)(CH_2)_3CN$ | Bis(trimethylsiloxy)methylsilane $(Me_3SiO)_2Si(Me)H$ | Allylcyanide $CH_2=CHCH_2CN$ |
| 35 | Beta-(hydroxymethyl)vinyl-bis(trimethylsiloxy)methylsilane $(Me_3SiO)_2Si(Me)CH=CHCH_2OH$ | Heptamethyltrisiloxane $(Me_3SiO)_2Si(Me)H$ | Propargyl alcohol $CH\equiv CCH_2OH$ |

The following additional example is offered for purposes of illustrating a typical utility application of the process of our invention in the modification of silicone-organic copolymeric hydraulic fluids to incorporate the lubricity properties of the perfluoro moiety therein. The

EXAMPLE 36

1,1-dihydroperfluorobutyl and 1,1,5-trihydroperfluoropentyl 4-pentenoates were prepared. The esterifications were accomplished by refluxing 30 mole-% excess of 4- pentenoic acid with the corresponding alcohol in the presence of toluene sulfonic acid as catalyst until the reactions were completed as determined by the rate of water formation. The reaction data and physical properties of the resulting 4-pentenoates are summarized in tabulated form below:

TABLE VIII

*Reaction conditions and physical properties of 4-pentenoates*

| Reaction Conditions | 1,1-Dihydroperfluorobutyl 4-Pentenoate | 1,1,5-Trihydroperfluoropentyl 4-Pentenoate |
|---|---|---|
| Alcohol (Moles) | 1.0 | 0.30 |
| Acid (Moles) | 1.3 | 0.40 |
| Catalyst (Grams) | 2.0 | 2.0 |
| Solvent | Benzene | Toluene |
| Volume (ml.) | 500 | 250 |
| Reflux time (Hrs.) | 99.5 | 21 |
| Water Recovered (percent Theo.) | 91 | 98 |
| Yield (percent) | 58.1 | 51.2 |
| Physical Properties: | | |
| Boiling Point (° C.) | 52/10 mm. | 108-9/10 mm. |
| Refractive Index ($n_D^{25}$) | 1.3469 | 1.3527 |
| Density ($d_4^{25}$) | 1.3115 | 1.4679 |
| Molecular Weight (Calc.) | 2.82.2 | 414.2 |
| Found | | 391+39 |
| $MR_D$ (Calc.) | 45.31 | 59.35 |
| Found | 45.91 | 61.51 |

Three modified copolymer fluids were prepared which exhibited improved lubricating properties as compared to the unmodified copolymer fluid used as the reference fluid. These fluids were—

(a)

$$[MeSi(CH_2)_4COOCH_2HBH^*][MeSi(CH_2)_4COOC_4H_9]_3$$
\* Hexachlorobicycloheptenyl (b)

$$[MeSi(CH_2)_4COOCH_2(CF_2)_3F]_4$$

(c)

$$[MeSi(CH_2)_4COOCH_2(CF_2)_4H]_4$$

whereas the reference fluid was—

(d)

$$[MeSi(CH_2)_4COOC_4H_9]_4$$

The cyclic copolymers were prepared by the addition of the corresponding 4-pentenoates (in 10% excess) to a refluxing mixture of $(MeHSiO)_4$ in the presence of one percent of platinum-on-gamma-alumina (containing one and one-half percent Pt) and butyl ether. In the case of the mixed cyclic copolymer, the HBH methyl 4-pentenoate was added first followed by the addition of butyl 4-pentenoate. The reaction mixtures were refluxed for an additional 10 hours, filtered, treated with decolorizing carbon, and finally stripped under vacuum at 150° C. using nitrogen as a sparge.

The physical properties of the resulting modified copolymer fluids are set forth in tabulated form below:

TABLE VIII

*Physical properties of modified cyclic copolymer fluids*

| Fluid | $d_4^{25}$ | Viscosity (cs.) 100° F. | Pour Point, ° F. |
|---|---|---|---|
| (a) $[MeSi(CH_2)_4COOC_4H_9]_3$ | 1.203 | 292 | −40 |
| (b) $[MeSi(CH_2)_4COOCH_2(CF_2)_3F]_4$ | 1.357 | 36.4 | −70 |
| (c) $[MeSi(CH_2)_4COOCH_2(CF_2)_4H]_4$ | 1.388 | 90.8 | −40 |
| (d) $[MeSi(CH_2)_4COOC_4H_9]_4$ | 1.019 | 31.5 | −85 |

A comparison of the lubricity of the modified cyclic polymer fluids is given in the following table:

TABLE IX

*Comparison of lubricity of modified cyclic copolymer fluids*

| | Falex[1] Load (lbs.) | Reciprocating Wear, 150° C., mg. | Reciprocating Failure Temp., ° C. |
|---|---|---|---|
| (a) $[MeSi(CH_2)_4COOCH_2HBF]$ $[MeSi(CH_2)_4COOC_4H_9]_3$ | 1,250 | 21 | 230 |
| (b) $[MeSi(CH_2)_4COOCH_2(CF_2)_3F]_4$ | 2,000 | 24 | 230 |
| (c) $[MeSi(CH_2)_4COOCH_2(CF_2)_4H]_4$ | 1,750 | 19 | [2] 230 |
| (d) $[MeSi(CH_2)_4COOC_4H_9]_4$ | 850 | | 175 est. |

[1] At 100 pounds breakin.
[2] Run on oil recovered from wear test.

It will be noted by reference to the foregoing table that the addition of either HBH or the perfluoro endgroups markedly increased the Falex load and the failure temperature in the reciprocating apparatus, thereby demonstrating the enhanced lubricating properties of the modified fluids. In the reciprocating wear test the modified fluids showed very low wear rates, and while an exact comparative value for the unmodified reference fluid is not available, it would be expected to be above 100 mg.

Having thus described the subject matter of my invention, what it is desired to secure by Letters Patent is:

1. Process for the production of organosilicon compounds that comprises forming a reaction mixture comprising an unsaturated organic compound other than acrylonitrile and allyl amine containing at least one carbon to carbon multiple bond selected from the group consisting of olefinic and acetylenic bonds, a siloxane free of olefinically and acetylenically unsaturated radicals and containing at least one silanic hydrogen bond, and a platinum catalyst; heating said reaction mixture to cause the organic compound and siloxane to react under influence of said platinum catalyst to effect addition of the silanic hydrogen bond to respective carbon atoms of the carbon to carbon multiple bond, with the production of an organosilicon adduct of said organic compound and siloxane; and separating and recovering said adduct from the reaction mixture.

2. Process for the production of organosilicon compounds that comprises forming a reaction mixture consisting of an unsaturated organic compound other than acrylonitrile and allyl amine containing at least one carbon to carbon multiple bond selected from the group consisting of olefinic and acetylenic bonds, a siloxane free of olefinically and acetylenically unsaturated radicals and containing at least one silanic hydrogen bond, a mutual organic solvent system for said organic compound and siloxane, and a finely-divided platinum catalyst; heating said reaction mixture to cause the organic compound and siloxane to react under influence of said platinum catalyst to effect addition of the silanic hydrogen bond to respective carbon atoms of the carbon to carbon multiple bond, with the production of an organosilicon adduct of said organic compound and siloxane; and separating and recovering said adduct from the reaction mixture.

3. Process for the production of organosilicon compounds that comprises forming a reaction mixture comprising an unsaturated organic compound other than acrylonitrile and allyl amine containing at least one carbon to carbon multiple bond selected from the group consisting of olefinic and acetylenic bonds, a siloxane free of olefinically and acetylenically unsaturated radicals and containing at least one silanic hydrogen bond, and a catalyst consisting of platinum supported on charcoal; heating said reaction mixture to cause the organic compound and siloxane to react under influence of said catalyst to effect addition of the silanic hydrogen bond to respective carbon atoms of the carbon to carbon multiple bond, with the production of an organosilicon adduct of said organic compound and siloxane; and separating and recovering said adduct from the reaction mixture.

4. Process for the production of organosilicon compounds that comprises forming a reaction mixture comprising an unsaturated organic compound other than acrylonitrile and allyl amine containing at least one carbon to carbon multiple bond selected from the group consisting of olefinic and acetylenic bonds, a siloxane free of olefinically and acetylenically unsaturated radicals and containing at least one silanic hydrogen bond, and a heterogeneous catalyst consisting of platinum-on-gamma-alumina; heating said reaction mixture to cause the organic compound and siloxane to react under influence of said catalyst to effect addition of the silanic hydrogen bond to respective carbon atoms of the carbon to carbon multiple bond, with the production of an organosilicon adduct of said organic compound and siloxane; and separating and recovering said adduct from the reaction mixture.

5. Process for the production of organosilicon compounds that comprises forming a reaction mixture comprising (1) an unsaturated hydrocarbon other than acrylonitrile and allyl amine containing at least one carbon to carbon multiple bond selected from the group consisting of olefinic and acetylenic bonds and at least one functional group selected from the class consisting of ester, ether, aldehyde, acetal, epoxide, nitrile, hydroxyl, and carboxyl groups, (2) a siloxane containing at least one silanic hydrogen bond and selected from the class consisting of siloxanes represented by the unit formula:

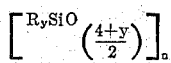

wherein $R_y$ represents a mixture of hydrogen and at least one radical selected from the group consisting of the saturated aliphatic hydrocarbon radicals and aromatic hydrocarbon radicals, such that—

H/Si ratio=1 or less
R/Si=3/1 to 1/1
$n=2$ or any greater whole number; and
$y=1$ to 3 and (3) a platinum catalyst; heating said reaction mixture to cause the organic compound and siloxane to react under influence of said catalyst to effect addition of the silanic hydrogen bond to respective carbon atoms of the carbon to carbon multiple bond of said organic compound, with the production of an organosilicon adduct of said organic compound and siloxane containing the functional group present within the original organic reactant; and separating and recovering said adduct from the reaction mixture.

6. Process for the production of organosilicon compounds that comprises forming a reaction mixture comprising (1) an unsaturated hydrocarbon other than acrylonitrile and allyl amine containing at least one carbon to carbon multiple bond selected from the group consisting of olefinic and acetylenic bonds and at least one functional group selected from the class consisting of ester, ether, aldehyde, acetal, epoxide, nitrile, hydroxyl, and carboxyl groups, (2) a siloxane containing at least one silanic hydrogen bond and selected from the class consisting of siloxanes represented by the unit formula:

wherein $R_y$ represents a mixture of hydrogen and at least one radical selected from the group consisting of the saturated aliphatic hydrocarbon radicals and aromatic hydrocarbon radicals, such that—

H/Si ratio=1 or less
R/Si=3/1 to 1/1
$n=2$ or any greater whole number; and
$y=1$ to 3 and (3) a heterogeneous catalyst consisting of platinum-on-gamma-alumina; heating said reaction mixture to cause the organic compound and siloxane to react under influence of said catalyst to effect addition of the silanic hydrogen bond to respective carbon atoms of the carbon to carbon multiple bond of said organic compound, with the production of an organosilicon adduct of said organic compound and siloxane containing the functional group present within the original organic reactant; and separating and recovering said adduct from the reaction mixture.

7. In a process for the thermal addition of a silanic hydrogen-containing siloxane that is free of olefinically and acetylenically unsaturated radicals to an unsaturated organic compound other than acrylonitrile and allyl amine containing at least one carbon to carbon multiple bond selected from the group consisting of olefinic and acetylenic bonds, the improvement that comprises catalyzing the addition reaction with elemental platinum.

8. In a process for the thermal addition of a silanic hydrogen-containing siloxane that is free of olefinically and acetylenically unsaturated radicals to an unsaturated organic compound other than acrylonitrile and allyl amine containing at least one carbon to carbon multiple bond selected from the group consisting of olefinic and acetylenic bonds, the improvement that comprises catalyzing said addition reaction with platinum-on-gamma-alumina.

9. Process for the production of polysiloxanes containing organic ether groups that comprises forming a reaction mixture comprising an unsaturated hydrocarbon containing at least one carbon to carbon multiple bond selected from the group consisting of olefinic and acetylenic bonds and at least one functional ether group, a siloxane free of olefinically and acetylenically unsaturated radicals and containing at least one silanic hydrogen bond, and a platinum catalyst; heating said reaction mixture to cause the hydrocarbon and siloxane to react under influence of said platinum catalyst to effect addition of the silanic hydrogen bond to respective carbon atoms of the carbon to carbon multiple bond, with the production of a hydrocarbon-siloxane adduct containing the functional ether group present within the original hydrocarbon reactant; and separating and recovering said adduct from the reaction mixture.

10. Process for the production of polysiloxanes containing organic ester groups that comprises forming a reaction mixture comprising an unsaturated hydrocarbon containing at least one carbon to carbon multiple bond selected from the group consisting of olefinic and acetylenic bonds and at least one functional ester group, a siloxane free of olefinically and acetylenically unsaturated radicals and containing at least one silanic hydrogen bond, and a platinum catalyst; heating said reaction mixture to cause the hydrocarbon and siloxane to react under influence of said platinum catalyst to effect addition of the silanic hydrogen bond to respective carbon atoms of the carbon to carbon multiple bond, with the production of a hydrocarbon-siloxane adduct containing the functional ester group present within the original hydrocarbon reactant; and separating and recovering said adduct from the reaction mixture.

11. Process for the production of polysiloxanes containing organic acetal groups that comprises forming a reaction mixture comprising an unsaturated hydrocarbon containing at least one carbon to carbon multiple bond selected from the group consisting of olefinic and acetylenic bonds and at least one functional acetal group, a siloxane free of olefinically and acetylenically unsaturated radicals and containing at least one silanic hydrogen bond, and a platinum catalyst; heating said reaction mixture to cause the hydrocarbon and siloxane to react under influence of said platinum catalyst to effect addition of the silanic hydrogen bond to respective carbon atoms of the carbon to carbon multiple bond, with the production of a hydrocarbon-siloxane adduct containing the functional acetal group present within the original hydrocarbon reactant; and separating and recovering said adduct from the reaction mixture.

12. Process for the production of polysiloxanes containing organic aldehyde groups that comprises forming a reaction mixture comprising an unsaturated hydrocarbon containing at least one carbon to carbon multiple bond selected from the group consisting of olefinic and acetylenic bonds and at least one functional acetal group, a siloxane free of olefinically and acetylenically unsaturated radicals and containing at least one silanic hydrogen bond, and a platinum catalyst; heating said reaction mixture to cause the hydrocarbon and siloxane to react under influence of said platinum catalyst to effect addition of the silanic hydrogen bond to respective carbon atoms of the carbon to carbon multiple bond, with the production of a hydrocarbon-siloxane adduct containing the functional acetal group present within the original hydrocarbon reactant; separating and recovering said acetal-siloxane adduct from the reaction mixture; subjecting the acetal-siloxane adduct to hydrolysis in the presence of an acid catalyst to effect conversion of the acetal group to the corresponding aldehyde group; and separating and recovering an aldehyde-siloxane adduct from the hydrolysis mixture.

13. Process for the production of polysiloxanes containing organic aldehyde groups that comprises forming a reaction mixture comprising an unsaturated hydrocarbon containing at least one functional aldehyde group and containing at least one member selected from the group consisting of olefinic and acetylenic bonds, a siloxane free of olefinically and acetylenically unsaturated radicals and containing at least one silanic hydrogen bond, and a platinum catalyst; heating said reaction mixture to cause the hydrocarbon and siloxane to react under influence of said platinum catalyst to effect addition of the silanic hydrogen bond to said hydrocarbon, with the production of a hydrocarbon-siloxane adduct containing the functional aldehyde group present within the original hydrocarbon reactant; and separating and recovering said aldehyde-siloxane adduct from the reaction mixture.

14. The process as claimed in claim 13 wherein said silanic hydrogen bond adds to the carbonyl group of said aldehyde-containing hydrocarbon reactant.

15. Process for the production of polysiloxanes containing organic epoxy groups that comprises forming a reaction mixture comprising an unsaturated hydrocarbon containing at least one carbon to carbon multiple bond selected from the group consisting of olefinic and acetylenic bonds and at least one functional epoxy group, a siloxane free of olefinically and acetylenically unsaturated radicals and containing at least one silanic hydrogen bond, and a platinum catalyst; heating said reaction mixture to cause the hydrocarbon and siloxane to react under influence of said platinum catalyst to effect addition of the silanic hydrogen bond to respective carbon atoms of the carbon to carbon multiple bond, with the production of a hydrocarbon siloxane adduct containing the functional epoxy group present within the original hydrocarbon reactant; and separating and recovering said adduct from the reaction mixture.

16. Process for the production of polysiloxanes containing organic alcohol groups that comprises forming a reaction mixture comprising an unsaturated hydrocarbon containing at least one carbon to carbon multiple bond selected from the group consisting of olefinic and acetylenic bonds and at least one functional alcohol group, a siloxane free of olefinically and acetylenically unsaturated radicals and containing at least one silanic hydrogen bond, and a platinum catalyst; heating said reaction mixture to cause the hydrocarbon and siloxane to react under influence of said platinum catalyst to effect addition of the silanic hydrogen bond to respective carbon atoms of the carbon to carbon multiple bond, with the production of a hydrocarbon siloxane adduct containing the functional alcohol group present within the original hydrocarbon reactant; and separating and recovering said adduct from the reaction mixture.

17. Process for the production of polysiloxanes containing organic hydroxy groups that comprises forming a reaction mixture comprising an unsaturated hydrocarbon containing at least one carbon to carbon multiple bond selected from the group consisting of olefinic and acetylenic bonds and at least one functional hydroxy group, a siloxane free of olefinically and acetylenically unsaturated radicals and containing at least one silanic hydrogen bond, and a platinum catalyst; heating said reaction mixture to cause the hydrocarbon and siloxane to react under influence of said platinum catalyst to effect addition of the silanic hydrogen bond to respective carbon atoms of the carbon to carbon multiple bond, with the production of a hydrocarbon siloxane adduct containing the functional hydroxy group present within the original hydrocarbon reactant; and separating and recovering said adduct from the reaction mixture.

18. Process for the production of polysiloxanes containing organic nitrile groups that comprises forming a reaction mixture comprising an unsaturated hydrocarbon other than acrylonitrile containing at least one carbon to carbon multiple bond selected from the group consisting of olefinic and acetylenic bonds and at least one functional nitrile group, a siloxane free of olefinically and acetylenically unsaturated radicals and containing at least one silanic hydrogen bond, and a platinum catalyst; heating said reaction mixture to cause the hydrocarbon and siloxane to react under influence of said platinum catalyst to effect addition of the silanic hydrocause the organic compound and siloxane to react under influence of said platinum catalyst to effect addition of the silanic hydrogen bond to respective carbon atoms of the carbon to carbon multiple bond, with the production of an organosilicon adduct of said organic compound and siloxane; and separating and recovering said adduct from the reaction mixture.

2. Process for the production of organosilicon compounds that comprises forming a reaction mixture consisting of an unsaturated organic compound other than acrylonitrile and allyl amine containing at least one carbon to carbon multiple bond selected from the group consisting of olefinic and acetylenic bonds, a siloxane free of olefinically and acetylenically unsaturated radicals and containing at least one silanic hydrogen bond, a mutual organic solvent system for said organic compound and siloxane, and a finely-divided platinum catalyst; heating said reaction mixture to cause the organic compound and siloxane to react under influence of said platinum catalyst to effect addition of the silanic hydrogen bond to respective carbon atoms of the carbon to carbon multiple bond, with the production of an organosilicon adduct of said organic compound and siloxane; and separating and recovering said adduct from the reaction mixture.

3. Process for the production of organosilicon compounds that comprises forming a reaction mixture comprising an unsaturated organic compound other than acrylonitrile and allyl amine containing at least one carbon to carbon multiple bond selected from the group consisting of olefinic and acetylenic bonds, a siloxane free of olefinically and acetylenically unsaturated radicals and containing at least one silanic hydrogen bond, and a catalyst consisting of platinum supported on charcoal; heating said reaction mixture to cause the organic compound and siloxane to react under influence of said catalyst to effect addition of the silanic hydrogen bond to respective carbon atoms of the carbon to carbon multiple bond, with the production of an organosilicon adduct of said organic compound and siloxane; and separating and recovering said adduct from the reaction mixture.

4. Process for the production of organosilicon compounds that comprises forming a reaction mixture comprising an unsaturated organic compound other than acrylonitrile and allyl amine containing at least one carbon to carbon multiple bond selected from the group consisting of olefinic and acetylenic bonds, a siloxane free of olefinically and acetylenically unsaturated radicals and containing at least one silanic hydrogen bond, and a heterogeneous catalyst consisting of platinum-on-gamma-alumina; heating said reaction mixture to cause the organic compound and siloxane to react under influence of said catalyst to effect addition of the silanic hydrogen bond to respective carbon atoms of the carbon to carbon multiple bond, with the production of an organosilicon adduct of said organic compound and siloxane; and separating and recovering said adduct from the reaction mixture.

5. Process for the production of organosilicon compounds that comprises forming a reaction mixture comprising (1) an unsaturated hydrocarbon other than acrylonitrile and allyl amine containing at least one carbon to carbon multiple bond selected from the group consisting of olefinic and acetylenic bonds and at least one functional group selected from the class consisting of ester, ether, aldehyde, acetal, epoxide, nitrile, hydroxyl, and carboxyl groups, (2) a siloxane containing at least one silanic hydrogen bond and selected from the class consisting of siloxanes represented by the unit formula:

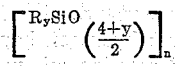

wherein $R_y$ represents a mixture of hydrogen and at least one radical selected from the group consisting of the saturated aliphatic hydrocarbon radicals and aromatic hydrocarbon radicals, such that—

H/Si ratio=1 or less
R/Si=3/1 to 1/1
$n=2$ or any greater whole number; and
$y=1$ to 3 and (3) a platinum catalyst; heating said reaction mixture to cause the organic compound and siloxane to react under influence of said catalyst to effect addition of the silanic hydrogen bond to respective carbon atoms of the carbon to carbon multiple bond of said organic compound, with the production of an organosilicon adduct of said organic compound and siloxane containing the functional group present within the original organic reactant; and separating and recovering said adduct from the reaction mixture.

6. Process for the production of organosilicon compounds that comprises forming a reaction mixture comprising (1) an unsaturated hydrocarbon other than acrylonitrile and allyl amine containing at least one carbon to carbon multiple bond selected from the group consisting of olefinic and acetylenic bonds and at least one functional group selected from the class consisting of ester, ether, aldehyde, acetal, epoxide, nitrile, hydroxyl, and carboxyl groups, (2) a siloxane containing at least one silanic hydrogen bond and selected from the class consisting of siloxanes represented by the unit formula:

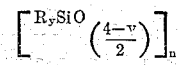

wherein $R_y$ represents a mixture of hydrogen and at least one radical selected from the group consisting of the saturated aliphatic hydrocarbon radicals and aromatic hydrocarbon radicals, such that—

H/Si ratio=1 or less
R/Si=3/1 to 1/1
$n=2$ or any greater whole number; and
$y=1$ to 3 and (3) a heterogeneous catalyst consisting of platinum-on-gamma-alumina; heating said reaction mixture to cause the organic compound and siloxane to react under influence of said catalyst to effect addition of the silanic hydrogen bond to respective carbon atoms of the carbon to carbon multiple bond of said organic compound, with the production of an organosilicon adduct of said organic compound and siloxane containing the functional group present within the original organic reactant; and separating and recovering said adduct from the reaction mixture.

7. In a process for the thermal addition of a silanic hydrogen-containing siloxane that is free of olefinically and acetylenically unsaturated radicals to an unsaturated organic compound other than acrylonitrile and allyl amine containing at least one carbon to carbon multiple bond selected from the group consisting of olefinic and acetylenic bonds, the improvement that comprises catalyzing the addition reaction with elemental platinum.

8. In a process for the thermal addition of a silanic hydrogen-containing siloxane that is free of olefinically and acetylenically unsaturated radicals to an unsaturated organic compound other than acrylonitrile and allyl amine containing at least one carbon to carbon multiple bond selected from the group consisting of olefinic and acetylenic bonds, the improvement that comprises catalyzing said addition reaction with platinum-on-gamma-alumina.

9. Process for the production of polysiloxanes containing organic ether groups that comprises forming a reaction mixture comprising an unsaturated hydrocarbon containing at least one carbon to carbon multiple bond selected from the group consisting of olefinic and acetylenic bonds and at least one functional ether group, a siloxane free of olefinically and acetylenically unsaturated radicals and containing at least one silanic hydrogen bond, and a platinum catalyst; heating said reaction mixture to cause the hydrocarbon and siloxane to react under influence of said platinum catalyst to effect addition of the silanic hydrogen bond to respective carbon atoms of the carbon to carbon multiple bond, with the production of a hydrocarbon-siloxane adduct containing the functional ether group present within the original hydrocarbon reactant; and separating and recovering said adduct from the reaction mixture.

10. Process for the production of polysiloxanes containing organic ester groups that comprises forming a reaction mixture comprising an unsaturated hydrocarbon containing at least one carbon to carbon multiple bond selected from the group consisting of olefinic and acetylenic bonds and at least one functional ester group, a siloxane free of olefinically and acetylenically unsaturated radicals and containing at least one silanic hydrogen bond, and a platinum catalyst; heating said reaction mixture to cause the hydrocarbon and siloxane to react under influence of said platinum catalyst to effect addition of the silanic hydrogen bond to respective carbon atoms of the carbon to carbon multiple bond, with the production of a hydrocarbon-siloxane adduct containing the functional ester group present within the original hydrocarbon reactant; and separating and recovering said adduct from the reaction mixture.

11. Process for the production of polysiloxanes containing organic acetal groups that comprises forming a reaction mixture comprising an unsaturated hydrocarbon containing at least one carbon to carbon multiple bond selected from the group consisting of olefinic and acetylenic bonds and at least one functional acetal group, a siloxane free of olefinically and acetylenically unsaturated radicals and containing at least one silanic hydrogen bond, and a platinum catalyst; heating said reaction mixture to cause the hydrocarbon and siloxane to react under influence of said platinum catalyst to effect addition of the silanic hydrogen bond to respective carbon atoms of the carbon to carbon multiple bond, with the production of a hydrocarbon-siloxane adduct containing the functional acetal group present within the original hydrocarbon reactant; and separating and recovering said adduct from the reaction mixture.

12. Process for the production of polysiloxanes containing organic aldehyde groups that comprises forming a reaction mixture comprising an unsaturated hydrocarbon containing at least one carbon to carbon multiple bond selected from the group consisting of olefinic and acetylenic bonds and at least one functional acetal group, a siloxane free of olefinically and acetylenically unsaturated radicals and containing at least one silanic hydrogen bond, and a platinum catalyst; heating said reaction mixture to cause the hydrocarbon and siloxane to react under influence of said platinum catalyst to effect addition of the silanic hydrogen bond to respective carbon atoms of the carbon to carbon multiple bond, with the production of a hydrocarbon-siloxane adduct containing the functional acetal group present within the original hydrocarbon reactant; separating and recovering said acetal-siloxane adduct from the reaction mixture; subjecting the acetal-siloxane adduct to hydrolysis in the presence of an acid catalyst to effect conversion of the acetal group to the corresponding aldehyde group; and separating and recovering an aldehyde-siloxane adduct from the hydrolysis mixture.

13. Process for the production of polysiloxanes containing organic aldehyde groups that comprises forming a reaction mixture comprising an unsaturated hydrocarbon containing at least one functional aldehyde group and containing at least one member selected from the group consisting of olefinic and acetylenic bonds, a siloxane free of olefinically and acetylenically unsaturated radicals and containing at least one silanic hydrogen bond, and a platinum catalyst; heating said reaction mixture to cause the hydrocarbon and siloxane to react under influence of said platinum catalyst to effect addition of the silanic hydrogen bond to said hydrocarbon, with the production of a hydrocarbon-siloxane adduct containing the functional aldehyde group present within the original hydrocarbon reactant; and separating and recovering said aldehyde-siloxane adduct from the reaction mixture.

14. The process as claimed in claim 13 wherein said silanic hydrogen bond adds to the carbonyl group of said aldehyde-containing hydrocarbon reactant.

15. Process for the production of polysiloxanes containing organic epoxy groups that comprises forming a reaction mixture comprising an unsaturated hydrocarbon containing at least one carbon to carbon multiple bond selected from the group consisting of olefinic and acetylenic bonds and at least one functional epoxy group, a siloxane free of olefinically and acetylenically unsaturated radicals and containing at least one silanic hydrogen bond, and a platinum catalyst; heating said reaction mixture to cause the hydrocarbon and siloxane to react under influence of said platinum catalyst to effect addition of the silanic hydrogen bond to respective carbon atoms of the carbon to carbon multiple bond, with the production of a hydrocarbon siloxane adduct containing the functional epoxy group present within the original hydrocarbon reactant; and separating and recovering said adduct from the reaction mixture.

16. Process for the production of polysiloxanes containing organic alcohol groups that comprises forming a reaction mixture comprising an unsaturated hydrocarbon containing at least one carbon to carbon multiple bond selected from the group consisting of olefinic and acetylenic bonds and at least one functional alcohol group, a siloxane free of olefinically and acetylenically unsaturated radicals and containing at least one silanic hydrogen bond, and a platinum catalyst; heating said reaction mixture to cause the hydrocarbon and siloxane to react under influence of said platinum catalyst to effect addition of the silanic hydrogen bond to respective carbon atoms of the carbon to carbon multiple bond, with the production of a hydrocarbon siloxane adduct containing the functional alcohol group present within the original hydrocarbon reactant; and separating and recovering said adduct from the reaction mixture.

17. Process for the production of polysiloxanes containing organic hydroxy groups that comprises forming a reaction mixture comprising an unsaturated hydrocarbon containing at least one carbon to carbon multiple bond selected from the group consisting of olefinic and acetylenic bonds and at least one functional hydroxy group, a siloxane free of olefinically and acetylenically unsaturated radicals and containing at least one silanic hydrogen bond, and a platinum catalyst; heating said reaction mixture to cause the hydrocarbon and siloxane to react under influence of said platinum catalyst to effect addition of the silanic hydrogen bond to respective carbon atoms of the carbon to carbon multiple bond, with the production of a hydrocarbon siloxane adduct containing the functional hydroxy group present within the original hydrocarbon reactant; and separating and recovering said adduct from the reaction mixture.

18. Process for the production of polysiloxanes containing organic nitrile groups that comprises forming a reaction mixture comprising an unsaturated hydrocarbon other than acrylonitrile containing at least one carbon to carbon multiple bond selected from the group consisting of olefinic and acetylenic bonds and at least one functional nitrile group, a siloxane free of olefinically and acetylenically unsaturated radicals and containing at least one silanic hydrogen bond, and a platinum catalyst; heating said reaction mixture to cause the hydrocarbon and siloxane to react under influence of said platinum catalyst to effect addition of the silanic hydrogen bond to respective carbon atoms of the carbon to carbon multiple bond, with the production of a hydrocarbon siloxane adduct containing the functional nitrile group present within the original hydrocarbon reactant; and separating and recovering said adduct from the reaction mixture.

19. A compound selected from the group consisting of the compounds represented by the formula:

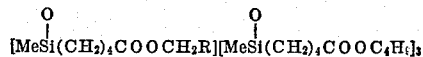

wherein R represents a hexachlorobicycloheptenyl radical,

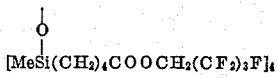

and

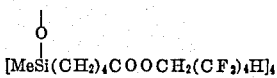

20. The copolymeric composition represented by the formula:

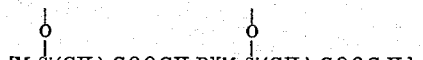

wherein R represents a hexachlorobicycloheptenyl radical.

21. The polymeric composition represented by the formula:

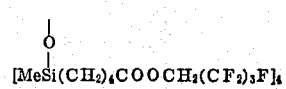

22. The polymeric composition represented by the formula:

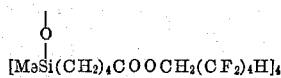

References Cited in the file of this patent

UNITED STATES PATENTS

| | | |
|---|---|---|
| 2,519,881 | Brewer | Aug. 22, 1950 |
| 2,632,013 | Wagner et al. | Mar. 17, 1953 |
| 2,637,738 | Wagner | May 5, 1953 |
| 2,721,873 | MacKenzie et al. | Oct. 25, 1955 |
| 2,723,987 | Speier | Nov. 15, 1955 |
| 2,803,637 | Speier | Aug. 20, 1957 |
| 2,811,541 | Curry | Oct. 29, 1957 |
| 2,823,218 | Speier et al. | Feb. 11, 1958 |
| 2,831,009 | Seyferth | Apr. 15, 1958 |
| 2,846,458 | Haluska | Aug. 5, 1958 |
| 2,851,473 | Wagner et al. | Sept. 9, 1958 |
| 2,868,824 | Haluska | Jan. 13, 1959 |
| 2,872,435 | Speier | Feb. 3, 1959 |

FOREIGN PATENTS

| | | |
|---|---|---|
| 786,020 | Great Britain | Nov. 6, 1957 |
| 1,116,725 | France | Feb. 6, 1956 |

OTHER REFERENCES

Speier et al.: "Journal Am. Chem. Soc.," vol. 79 (Feb. 20, 1957), pages 974–9.